US012671578B2

(12) United States Patent
Elshafie et al.

(10) Patent No.: US 12,671,578 B2
(45) Date of Patent: Jun. 30, 2026

(54) TECHNIQUES FOR ON-DEMAND SECRET KEY REQUESTING AND SHARING

(71) Applicant: QUALCOMM INCORPORATED, San Diego, CA (US)

(72) Inventors: Ahmed Elshafie, San Diego, CA (US); Hung Dinh Ly, San Diego, CA (US); Alexandros Manolakos, Athens (GR)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 18/683,351

(22) PCT Filed: Aug. 22, 2022

(86) PCT No.: PCT/US2022/075277
§ 371 (c)(1),
(2) Date: Feb. 13, 2024

(87) PCT Pub. No.: WO2023/059960
PCT Pub. Date: Apr. 13, 2023

(65) Prior Publication Data
US 2024/0348439 A1     Oct. 17, 2024

(30) Foreign Application Priority Data

Oct. 4, 2021    (GR) ............................... 20210100673

(51) Int. Cl.
*H04L 9/08* (2006.01)
*H04W 12/0431* (2021.01)

(52) U.S. Cl.
CPC ............ *H04L 9/0891* (2013.01); *H04L 9/085* (2013.01); *H04W 12/0431* (2021.01)

(58) Field of Classification Search
CPC ........... H04W 12/0433; H04W 12/041; H04W 12/043; H04W 12/0431; H04L 63/062; H04L 9/085; H04L 9/0891
See application file for complete search history.

(56) References Cited

U.S. PATENT DOCUMENTS

| | | | | |
|---|---|---|---|---|
| 8,244,137 | B1 * | 8/2012 | Chen ................... | H04B 10/1141 398/118 |
| 11,019,670 | B1 * | 5/2021 | Pan ........................ | H04W 76/14 |

(Continued)

FOREIGN PATENT DOCUMENTS

| | | |
|---|---|---|
| WO | WO-2020238957 A1 | 12/2020 |
| WO | WO-2021093891 A1 | 5/2021 |

OTHER PUBLICATIONS

International Search Report and Written Opinion—PCT/US2022/075277—ISA/EPO—Nov. 28, 2022.

*Primary Examiner* — Mohammad A Siddiqi
(74) *Attorney, Agent, or Firm* — Holland & Hart LLP/Qualcomm

(57) ABSTRACT

Methods, systems, and devices for wireless communications are described. A user equipment (UE) may transmit a request for an on-demand secret key to a network entity, such as if a secret key for a sidelink channel has expired before a refresh timer of the secret key expires. The UE may transmit a request for an update to a secret key associated with a first physical layer channel secured for sidelink communications based on the secret key being expired. The request may include an identifier of the first physical layer channel associated with the secret key. The UE may receive the update to the secret key based transmitting the request. In some cases, the UE may transmit an indication of the update to the secret key to a second UE.

30 Claims, 16 Drawing Sheets

(56)          References Cited

U.S. PATENT DOCUMENTS

| | | | |
|---|---|---|---|
| 2003/0016827 A1* | 1/2003 | Asano | H04L 9/0891 |
| 2012/0314866 A1* | 12/2012 | Horneman | H04W 12/041 |
| | | | 380/270 |
| 2013/0315393 A1* | 11/2013 | Wang | H04W 12/06 |
| | | | 380/270 |
| 2015/0351084 A1* | 12/2015 | Werb | H04W 12/033 |
| | | | 370/329 |
| 2017/0012753 A1* | 1/2017 | Kim | H04L 27/2657 |
| 2017/0215154 A1* | 7/2017 | Kim | H04B 17/318 |
| 2017/0238337 A1* | 8/2017 | Lee | H04W 28/0278 |
| | | | 370/329 |
| 2018/0049129 A1* | 2/2018 | Li | H04W 52/0235 |
| 2018/0167974 A1* | 6/2018 | Li | H04L 5/0001 |
| 2019/0387401 A1* | 12/2019 | Liao | H04W 4/08 |
| 2021/0219138 A1* | 7/2021 | Comarmond | H04W 8/205 |
| 2022/0124489 A1* | 4/2022 | Lu | H04L 69/04 |
| 2022/0166788 A1* | 5/2022 | Grammel | G06F 21/552 |
| 2023/0117327 A1* | 4/2023 | Lee | H04W 12/04 |
| | | | 370/329 |
| 2024/0080316 A1* | 3/2024 | Wong | H04L 63/0846 |

* cited by examiner

Update
Request
210

215
Update 115-a 205-a 205-b 105-a 115-b 205-c 115-c

220

200

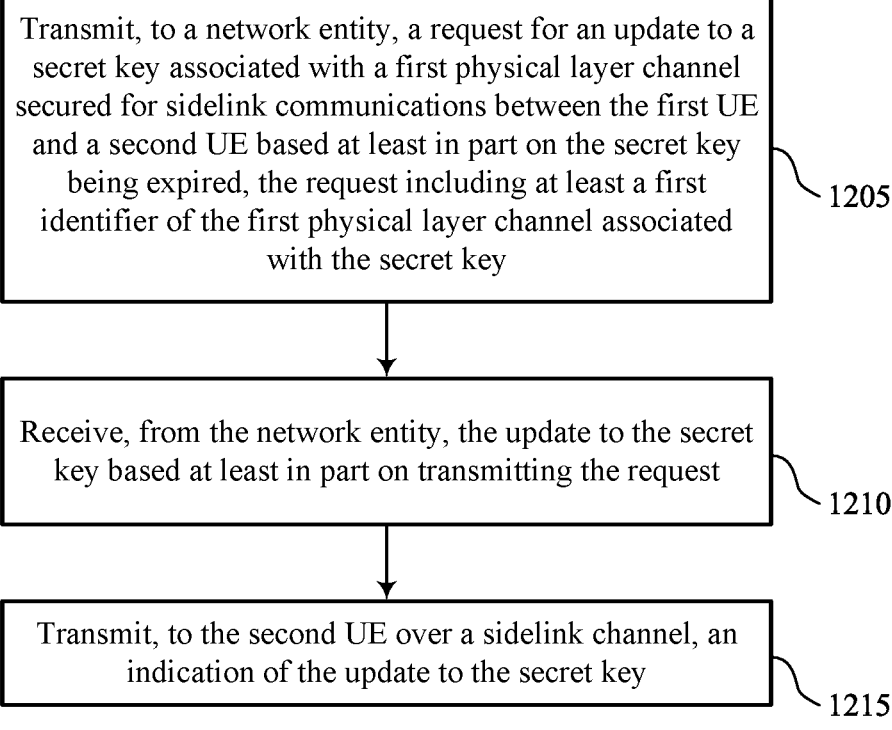

Transmit, to a network entity, a request for an update to a secret key associated with a first physical layer channel secured for sidelink communications between the first UE and a second UE based at least in part on the secret key being expired, the request including at least a first identifier of the first physical layer channel associated with the secret key

1205

Receive, from the network entity, the update to the secret key based at least in part on transmitting the request

1210

Transmit, to the second UE over a sidelink channel, an indication of the update to the secret key

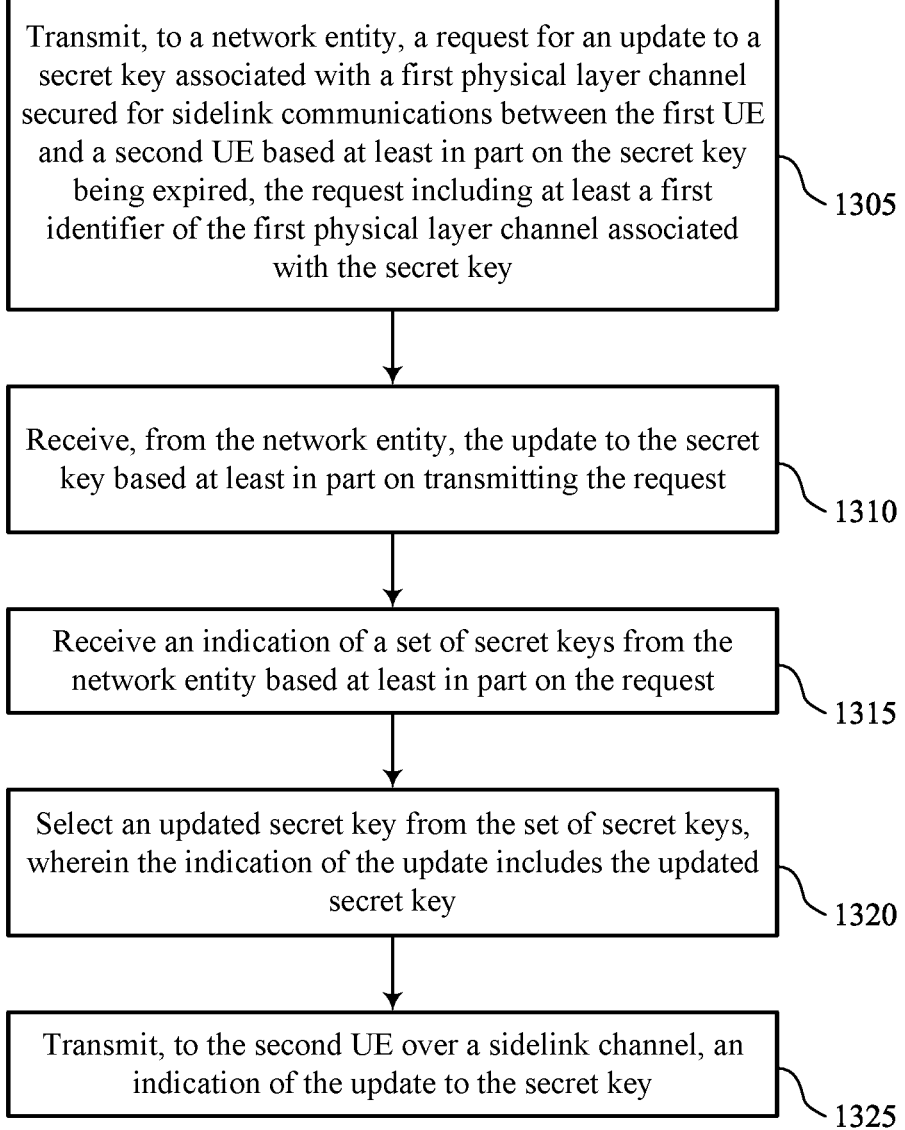

Transmit, to a network entity, a request for an update to a secret key associated with a first physical layer channel secured for sidelink communications between the first UE and a second UE based at least in part on the secret key being expired, the request including at least a first identifier of the first physical layer channel associated with the secret key

1305

Receive, from the network entity, the update to the secret key based at least in part on transmitting the request

1310

Receive an indication of a set of secret keys from the network entity based at least in part on the request

1315

Select an updated secret key from the set of secret keys, wherein the indication of the update includes the updated secret key

1320

Transmit, to the second UE over a sidelink channel, an indication of the update to the secret key

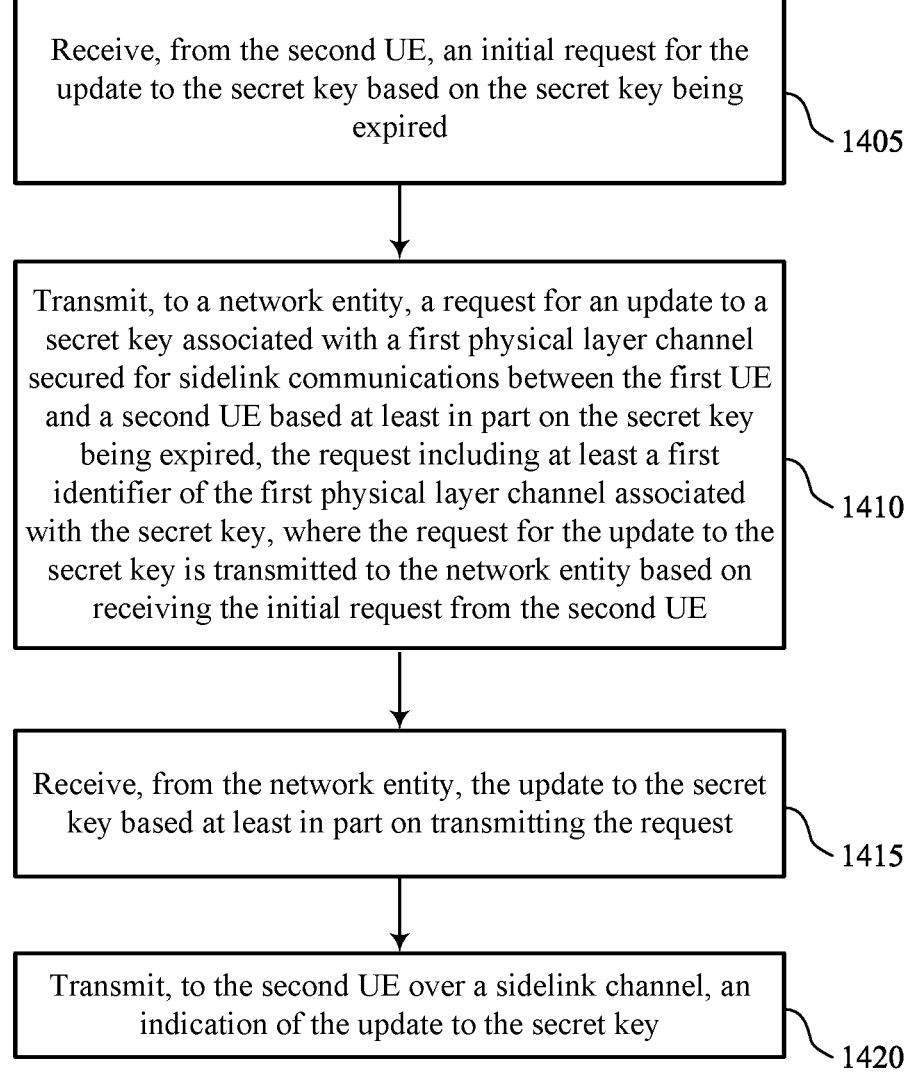

Receive, from the second UE, an initial request for the update to the secret key based on the secret key being expired

1405

Transmit, to a network entity, a request for an update to a secret key associated with a first physical layer channel secured for sidelink communications between the first UE and a second UE based at least in part on the secret key being expired, the request including at least a first identifier of the first physical layer channel associated with the secret key, where the request for the update to the secret key is transmitted to the network entity based on receiving the initial request from the second UE

1410

Receive, from the network entity, the update to the secret key based at least in part on transmitting the request

1415

Transmit, to the second UE over a sidelink channel, an indication of the update to the secret key

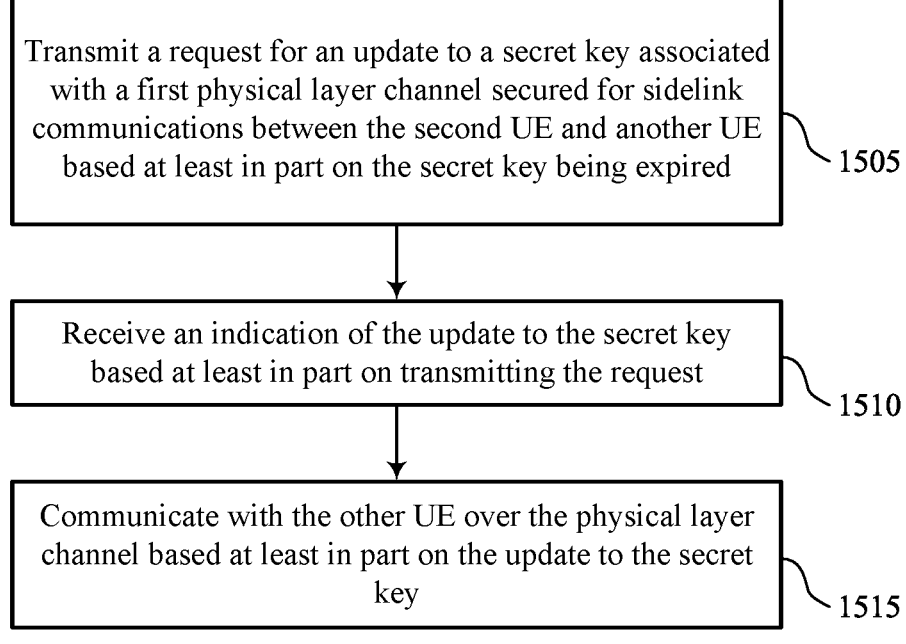

Transmit a request for an update to a secret key associated with a first physical layer channel secured for sidelink communications between the second UE and another UE based at least in part on the secret key being expired

1505

Receive an indication of the update to the secret key based at least in part on transmitting the request

1510

Communicate with the other UE over the physical layer channel based at least in part on the update to the secret key

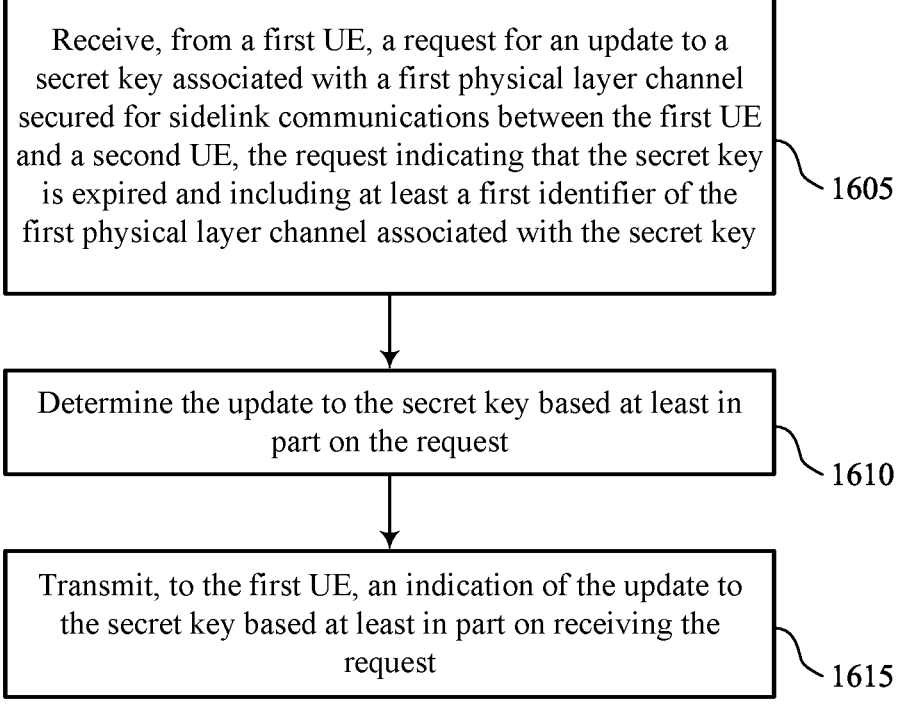

Receive, from a first UE, a request for an update to a secret key associated with a first physical layer channel secured for sidelink communications between the first UE and a second UE, the request indicating that the secret key is expired and including at least a first identifier of the first physical layer channel associated with the secret key

1605

Determine the update to the secret key based at least in part on the request

1610

Transmit, to the first UE, an indication of the update to the secret key based at least in part on receiving the request

TECHNIQUES FOR ON-DEMAND SECRET KEY REQUESTING AND SHARING

CROSS REFERENCES

The present Application is a 371 national stage filing of International PCT Application No. PCT/US2022/075277 by Elshafie et al. entitled "TECHNIQUES FOR ON-DEMAND SECRET KEY REQUESTING AND SHARING," filed Aug. 22, 2022; and claims priority to Greek Patent Application No. 20210100673 by Elshafie et al. entitled "TECHNIQUES FOR ON-DEMAND SECRET KEY REQUESTING AND SHARING," filed Oct. 4, 2021, each of which is assigned to the assignee hereof, and each of which is expressly incorporated by reference in its entirety herein.

FIELD OF TECHNOLOGY

The following relates to wireless communications, including techniques for on-demand secret key requesting and sharing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless communications system may communicate securely using secret keys. Systems implementing sidelink communications may also use secret keys for secure sidelink communications. Techniques for providing and managing secret keys for sidelink communications may be deficient.

SUMMARY

The described techniques relate to improved methods, systems, devices, and apparatuses that support techniques for on-demand secret key requesting and sharing. Generally, the described techniques provide for requesting an update for a secret key associated with a physical layer of a sidelink channel. For example, the secret key may expire before a refresh timer for the secret key expires due to the secret key being used a threshold number of times. A network entity, such as a base station, may be unaware that the secret key associated with the sidelink channel has expired before the refresh timer expires. Therefore, a user equipment (UE) may transmit a request for an update to the secret key to the network entity. The UE may request a new secret key, a key refresh, a certain security level for the secret key, or any combination thereof. The request may include an identifier for a physical layer channel secured for sidelink communications associated with the secret key. For example, a relay UE may request an update for a secret key which is associated with a sidelink channel between other UEs, and the relay UE may include an identifier of the sidelink channel between the other UEs in the request.

A method for wireless communications at a first UE is described. The method may include transmitting, to a network entity, a request for an update to a secret key associated with a first physical layer channel secured for sidelink communications between the first UE and a second UE based on the secret key being expired, the request including at least a first identifier of the first physical layer channel associated with the secret key, receiving, from the network entity, the update to the secret key based on transmitting the request, and transmitting, to the second UE over a sidelink channel, an indication of the update to the secret key.

An apparatus for wireless communications at a first UE is described. The apparatus may include a processor, memory coupled with the processor, and instructions stored in the memory. The instructions may be executable by the processor to cause the apparatus to transmit, to a network entity, a request for an update to a secret key associated with a first physical layer channel secured for sidelink communications between the first UE and a second UE based on the secret key being expired, the request including at least a first identifier of the first physical layer channel associated with the secret key, receive, from the network entity, the update to the secret key based on transmitting the request, and transmit, to the second UE over a sidelink channel, an indication of the update to the secret key.

Another apparatus for wireless communications at a first UE is described. The apparatus may include means for transmitting, to a network entity, a request for an update to a secret key associated with a first physical layer channel secured for sidelink communications between the first UE and a second UE based on the secret key being expired, the request including at least a first identifier of the first physical layer channel associated with the secret key, means for receiving, from the network entity, the update to the secret key based on transmitting the request, and means for transmitting, to the second UE over a sidelink channel, an indication of the update to the secret key.

A non-transitory computer-readable medium storing code for wireless communications at a first UE is described. The code may include instructions executable by a processor to transmit, to a network entity, a request for an update to a secret key associated with a first physical layer channel secured for sidelink communications between the first UE and a second UE based on the secret key being expired, the request including at least a first identifier of the first physical layer channel associated with the secret key, receive, from the network entity, the update to the secret key based on transmitting the request, and transmit, to the second UE over a sidelink channel, an indication of the update to the secret key.

In some examples of the method, apparatuses, and non-transitory computer-readable medium described herein, receiving the update to the secret key may include operations, features, means, or instructions for receiving an indication of a set of secret keys from the network entity based on the request and selecting an updated secret key from the set of secret keys, where the indication of the update includes the updated secret key.

In some examples of the method, apparatuses, and non-transitory computer-readable medium described herein, selecting the updated secret key may include operations, features, means, or instructions for selecting the updated secret key based on a request from the second UE for the update to the secret key.

Some examples of the method, apparatuses, and non-transitory computer-readable medium described herein may further include operations, features, means, or instructions for receiving a configuration for the sidelink channel including time and frequency resource scheduling information and a sidelink reference signal configuration, where the indication of the update to the secret key may be transmitted based on the configuration for the sidelink channel.

In some examples of the method, apparatuses, and non-transitory computer-readable medium described herein, receiving the update to the secret key may include operations, features, means, or instructions for receiving an indication of an updated secret key from the network entity based on the request, where the indication of the update includes the updated secret key.

In some examples of the method, apparatuses, and non-transitory computer-readable medium described herein, the indication of the updated secret key may be received via Radio Resource Control (RRC) signaling, downlink shared channel signaling, downlink control information, a medium access control (MAC) control element (CE), or any combination thereof.

Some examples of the method, apparatuses, and non-transitory computer-readable medium described herein may further include operations, features, means, or instructions for receiving, from the second UE, an initial request for the update to the secret key based on the secret key being expired, where the request for the update to the secret key may be transmitted to the network entity based on receiving the initial request from the second UE.

In some examples of the method, apparatuses, and non-transitory computer-readable medium described herein, the initial request includes a request for a key refresh, a higher security secret key, or a new secret key, or any combination thereof and the update for the secret key includes the key refresh, the higher security secret key, or the new secret key, or any combination thereof.

In some examples of the method, apparatuses, and non-transitory computer-readable medium described herein, the initial request for the update may be received from the second UE via sidelink control information, PC5 RRC signaling, a PC5 MAC CE, or any combination thereof.

In some examples of the method, apparatuses, and non-transitory computer-readable medium described herein, transmitting the request for the update to the secret key may include operations, features, means, or instructions for transmitting the request for a new secret key, a security level for the update to the secret key, a refresh for the secret key, or any combination thereof, where the update to the secret key includes the new secret key, may be based on the security level, or includes the refresh for the secret key, or any combination thereof.

Some examples of the method, apparatuses, and non-transitory computer-readable medium described herein may further include operations, features, means, or instructions for detecting a beam failure on the sidelink channel, where the request for the update to the secret key may be transmitted based on detecting the beam failure and extracting the update for the secret key based on a previous secret key.

Some examples of the method, apparatuses, and non-transitory computer-readable medium described herein may further include operations, features, means, or instructions for updating the secret key based on the update to the secret key, where the first identifier for the first physical layer channel corresponds to the sidelink channel and communicating with the second UE over the sidelink channel based on updating the secret key.

In some examples of the method, apparatuses, and non-transitory computer-readable medium described herein, transmitting the indication of the update may include operations, features, means, or instructions for transmitting the indication of the update to the second UE and a third UE based on a second sidelink channel between the second UE and the third UE, where the first identifier for the first physical layer channel corresponds to the second sidelink channel.

In some examples of the method, apparatuses, and non-transitory computer-readable medium described herein, the request includes one or more of a resource pool identifier, a subchannel identifier, a timestamp corresponding to a latest time for transmission of the update to the secret key, one or more cryptographic properties for the update to the secret key, a cryptographic quality of service for the update to the secret key, a maximum number of uses for the update to the secret key, a maximum refresh time for the update to the secret key, or any combination thereof.

A method for wireless communications at a second UE is described. The method may include transmitting a request for an update to a secret key associated with a first physical layer channel secured for sidelink communications between the second UE and another UE based on the secret key being expired, receiving an indication of the update to the secret key based on transmitting the request, and communicating with the other UE over the physical layer channel based on the update to the secret key.

An apparatus for wireless communications at a second UE is described. The apparatus may include a processor, memory coupled with the processor, and instructions stored in the memory. The instructions may be executable by the processor to cause the apparatus to transmit a request for an update to a secret key associated with a first physical layer channel secured for sidelink communications between the second UE and another UE based on the secret key being expired, receive an indication of the update to the secret key based on transmitting the request, and communicate with the other UE over the physical layer channel based on the update to the secret key.

Another apparatus for wireless communications at a second UE is described. The apparatus may include means for transmitting a request for an update to a secret key associated with a first physical layer channel secured for sidelink communications between the second UE and another UE based on the secret key being expired, means for receiving an indication of the update to the secret key based on transmitting the request, and means for communicating with the other UE over the physical layer channel based on the update to the secret key.

A non-transitory computer-readable medium storing code for wireless communications at a second UE is described. The code may include instructions executable by a processor to transmit a request for an update to a secret key associated with a first physical layer channel secured for sidelink communications between the second UE and another UE based on the secret key being expired, receive an indication of the update to the secret key based on transmitting the request, and communicate with the other UE over the physical layer channel based on the update to the secret key.

In some examples of the method, apparatuses, and non-transitory computer-readable medium described herein, transmitting the request for the update may include operations, features, means, or instructions for transmitting the request to a first UE, where the indication of the update to the secret key may be received from the first UE.

In some examples of the method, apparatuses, and non-transitory computer-readable medium described herein, the request includes a request for a key refresh, a higher security secret key, or a new secret key, or any combination thereof and the update for the secret key includes the key refresh, the higher security secret key, or the new secret key, or any combination thereof.

In some examples of the method, apparatuses, and non-transitory computer-readable medium described herein, the request for the update for the secret key may be transmitted to the first UE via sidelink control information, PC5 RRC signaling, a PC5 MAC CE, or any combination thereof.

Some examples of the method, apparatuses, and non-transitory computer-readable medium described herein may further include operations, features, means, or instructions for communicating with the other UE or a third UE over the sidelink channel based on the update to the secret key.

In some examples of the method, apparatuses, and non-transitory computer-readable medium described herein, transmitting the request for the update to the secret key may include operations, features, means, or instructions for transmitting the request to a network entity, where the indication of the update to the secret key may be received from the network entity.

In some examples of the method, apparatuses, and non-transitory computer-readable medium described herein, the request for the update to the secret key includes a request for a key refresh, a higher security secret key, or a new secret key, or any combination thereof and the update for the secret key includes the key refresh, the higher security secret key, or the new secret key, or any combination thereof.

In some examples of the method, apparatuses, and non-transitory computer-readable medium described herein, the indication of the update to the secret key may be received via RRC signaling, downlink shared channel signaling, downlink control information, a MAC CE, or any combination thereof.

Some examples of the method, apparatuses, and non-transitory computer-readable medium described herein may further include operations, features, means, or instructions for detecting a beam failure on the sidelink channel, where the request for the update to the secret key may be transmitted based on detecting the beam failure and extracting the update for the secret key based on a previous secret key.

A method for wireless communications at a network entity is described. The method may include receiving, from a first UE, a request for an update to a secret key associated with a first physical layer channel secured for sidelink communications between the first UE and a second UE, the request indicating that the secret key is expired and including at least a first identifier of the first physical layer channel associated with the secret key, determining the update to the secret key based on the request, and transmitting, to the first UE, an indication of the update to the secret key based on receiving the request.

An apparatus for wireless communications at a network entity is described. The apparatus may include a processor, memory coupled with the processor, and instructions stored in the memory. The instructions may be executable by the processor to cause the apparatus to receive, from a first UE, a request for an update to a secret key associated with a first physical layer channel secured for sidelink communications between the first UE and a second UE, the request indicating that the secret key is expired and including at least a first identifier of the first physical layer channel associated with the secret key, determine the update to the secret key based on the request, and transmit, to the first UE, an indication of the update to the secret key based on receiving the request.

Another apparatus for wireless communications at a network entity is described. The apparatus may include means for receiving, from a first UE, a request for an update to a secret key associated with a first physical layer channel secured for sidelink communications between the first UE and a second UE, the request indicating that the secret key is expired and including at least a first identifier of the first physical layer channel associated with the secret key, means for determining the update to the secret key based on the request, and means for transmitting, to the first UE, an indication of the update to the secret key based on receiving the request.

A non-transitory computer-readable medium storing code for wireless communications at a network entity is described. The code may include instructions executable by a processor to receive, from a first UE, a request for an update to a secret key associated with a first physical layer channel secured for sidelink communications between the first UE and a second UE, the request indicating that the secret key is expired and including at least a first identifier of the first physical layer channel associated with the secret key, determine the update to the secret key based on the request, and transmit, to the first UE, an indication of the update to the secret key based on receiving the request.

Some examples of the method, apparatuses, and non-transitory computer-readable medium described herein may further include operations, features, means, or instructions for transmitting, to an external cryptographic entity, a request message including the request received from the first UE and receiving, from the external cryptographic entity, an indication of the update to the secret key based on the request message.

In some examples of the method, apparatuses, and non-transitory computer-readable medium described herein, transmitting the indication of the update to the secret key may include operations, features, means, or instructions for transmitting an indication of a set of secret keys to the first UE based on the request.

Some examples of the method, apparatuses, and non-transitory computer-readable medium described herein may further include operations, features, means, or instructions for transmitting a configuration for a sidelink channel including time and frequency resource scheduling information and a sidelink reference signal configuration, where the update to the secret key may be based on the configuration for the sidelink channel.

In some examples of the method, apparatuses, and non-transitory computer-readable medium described herein, receiving the update to the secret key may include operations, features, means, or instructions for transmitting an indication of an updated secret key to the first UE based on the request, where the indication of the update includes the updated secret key.

Some examples of the method, apparatuses, and non-transitory computer-readable medium described herein may further include operations, features, means, or instructions for receiving an indication of a beam failure from the first UE, where the request for the update to the secret key may be received based on the beam failure and triggering resources for extracting the update for the secret key based on a previous secret key and the indication of the beam failure.

BRIEF DESCRIPTION OF THE DRAWINGS

FIGS. 12 through 16 show flowcharts illustrating methods that support techniques for on-demand secret key requesting and sharing in accordance with aspects of the present disclosure.

DETAILED DESCRIPTION

A wireless communications system may use secret keys for secure communications. In systems with many different devices, such as Internet of Things (IoT) systems, secure communications is critical, as many different devices may be connected to each other. Some wireless communications systems may use secret keys for sidelink communications between user equipment (UE) among other IoT devices. A secret key may expire after a certain number of uses or after a key refresh timer expires. For example, after a key is used a certain number of times, the key may be expired and may not be used for secure communications. In some cases, a network entity, such as a base station, may share a secret key to be used by UEs or devices on a sidelink. However, the base station may not be aware of how many times the secret key has been used or when the secret key expires, such as if the secret key expires before the key refresh time. Therefore, in some systems, if a secret key for sidelink communications expires, the UEs which were using the expired secret key would wait for the key refresh time to expire in order to receive a new secret key. This may delay sidelink communications or lead to unsecure communications.

The present disclosure provides techniques for an on-demand secret key. For example, a UE may transmit a request for an update to a secret key. For example, the UE may transmit a request to a network entity to refresh the secret key or for the network entity to provide a new secret key. The network entity may provide the update for the secret key to the UE, including a refresh for the timer, a more secure secret key, or a new secret key, or any combination thereof. In some cases, a relay UE may send the request to the network entity to request the update for a sidelink channel between two other UEs, such as IoT devices. The request may include one or more identifiers for physical layer channels with expired secret keys. For example, the relay UE may indicate a physical layer channel identifier of the sidelink channel between the two IoT devices. The network may determine an update for the secret key used for the sidelink channel between the two IoT devices and send the update for the secret key to the relay UE, one or more of the IoT devices, or any combination thereof.

Aspects of the disclosure are initially described in the context of wireless communications systems. Aspects of the disclosure are further illustrated by and described with reference to apparatus diagrams, system diagrams, and flowcharts that relate to techniques for on-demand secret key requesting and sharing.

Figure 1:
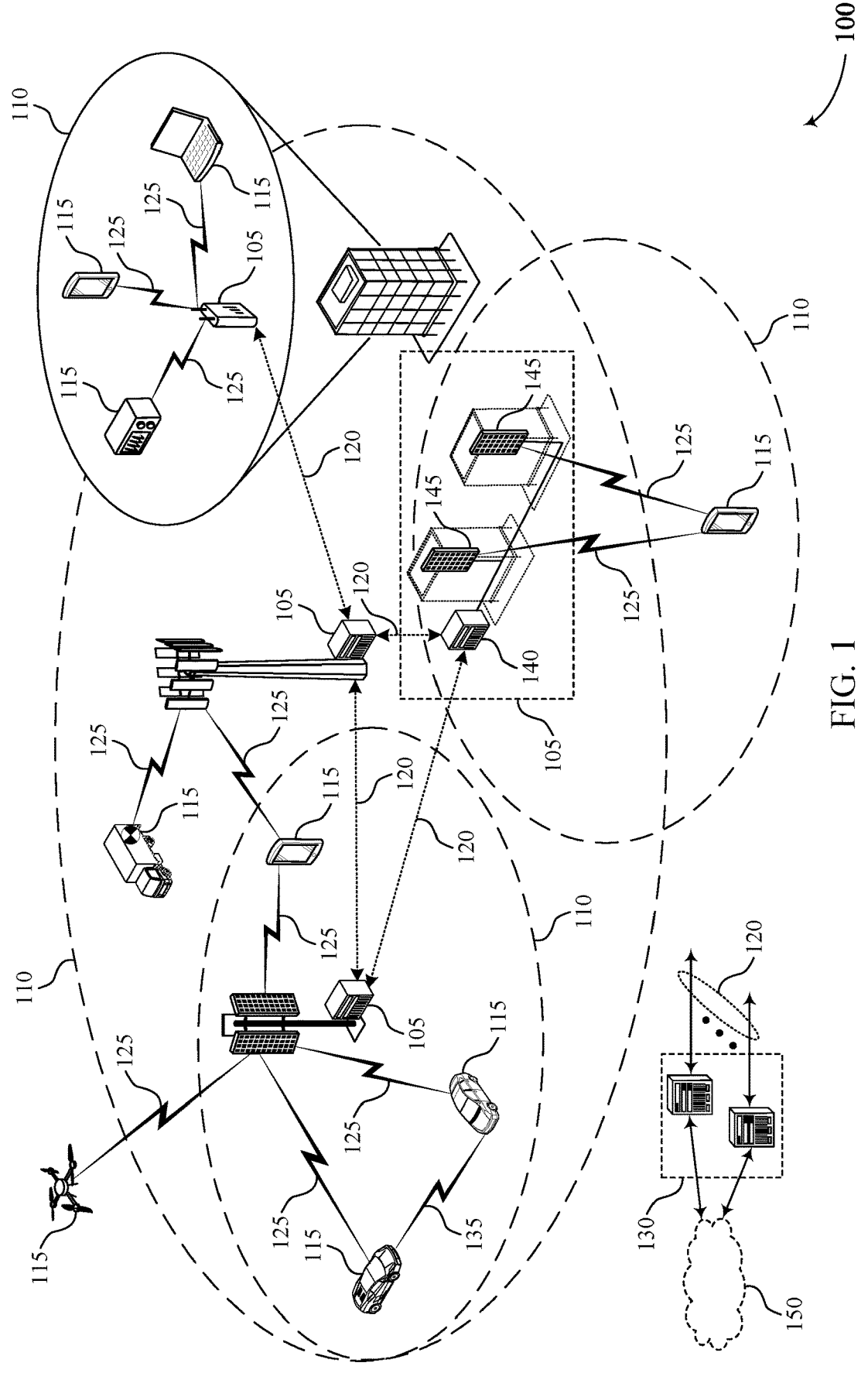
FIG. 1 illustrates an example of a wireless communications system that supports techniques for on-demand secret key requesting and sharing in accordance with aspects of the present disclosure.

FIG. 1 illustrates an example of a wireless communications system 100 that supports techniques for on-demand secret key requesting and sharing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may use secret keys for secure communications. For example, the wireless communications 100 systems may use secret keys for sidelink communications between UEs 115, such as IoT devices. A secret key may expire after a certain number of uses or after a key refresh timer expires. For example, after a key is used a certain number of times, the key may be expired and may not be used for secure communications. In some cases, a key may become less secure after each use, and once the security for a key drops below a threshold, the key may be considered expired. For example, after each use of a secret key, a counter may be incremented. A degradation rate may be assumed for each secret key, and after each usage, the secret key security may be decreased. Once the degradation level is below a configured threshold, the secret key may be assumed to be expired.

In some cases, a device in the wireless communications system 100 may derive a secret key. For example, a UE 115 may be provisioned with network-specific information, including a long term key, K, a key refresh interval, $T_{Refresh}$, a current time, $T_{Current}$, a key ID, $K_{ID}$, and a hyper frame number, and a subframe number. A network entity may broadcast a root key, $K_{B\text{-}Root}$, which may be derived according to a key derivation function based on the current time, the key refresh interval, and other network-specific parameters which may be provisioned to the UE 115. In some cases, the UE 115 may determine a cell-specific key for a cell from $K_{B\text{-}Root}$ based on a cell identifier of the cell. In some examples, a network node may be provisioned with $K_{B\text{-}Root}$ for each supported cell by the network operator, such as via an AMF entity, an operations, administration, and maintenance (OAM) entity, or a key management facility (KMF). In some examples, a UE 115 may derive a radio access network (RAN) node-specific key, $K_{B\text{-}RAN}$, from $K_{B\text{-}Root}$ and an identifier of a network entity, such as a base station 105. A network node may be provisioned with $K_{B\text{-}RAN}$ by the network operator, such as via an AMF entity, a unified data management (UDM) entity, or an OAM. A UE 115 and the network node may derive a cell-specific $K_{B\text{-}Cell}$ based on $K_{B\text{-}RAN}$ and a cell identifier, where the cell identifier may be conveyed in a synchronization signal block (SSB). In some other examples, a secret key may be directly indicated (e.g., over-the-air, via backhaul links, etc.) instead of being derived at devices.

In some cases, a network entity, such as a base station 105, may share a secret key to be used by UEs 115 or devices on a sidelink. However, the base station 105 may not be aware of how many times the secret key has been used or when the secret key expires, such as if the secret key expires before the key refresh time. The wireless communications system 100, and wireless communications systems described herein, may implement techniques for an on-demand secret key. For example, a UE 115 may send a request to a network entity, such as a base station 105, to get a new secret key or to refresh the secret key.

Figure 2:
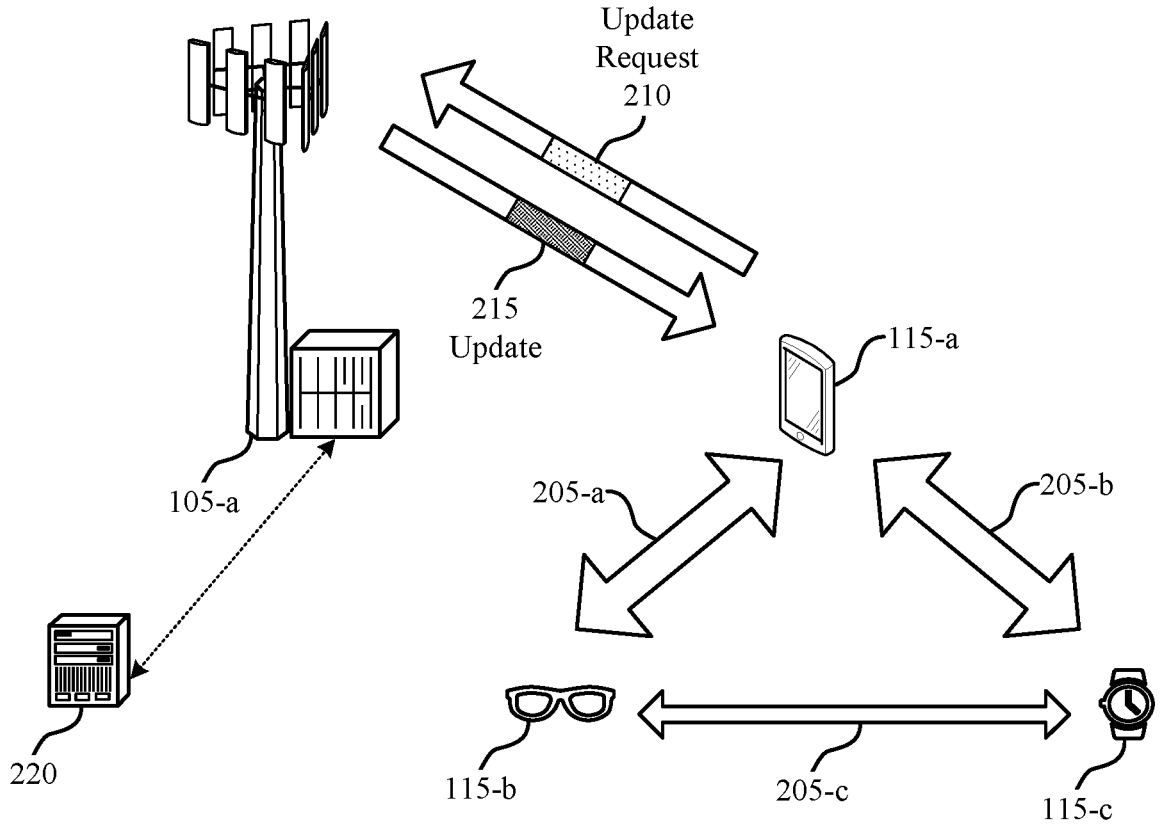
FIG. 2 illustrates an example of a wireless communications system that supports techniques for on-demand secret key requesting and sharing in accordance with aspects of the present disclosure.

FIG. 2 illustrates an example of a wireless communications system 200 that supports techniques for on-demand secret key requesting and sharing in accordance with aspects of the present disclosure. The wireless communications system 200 may include a base station 105-a, a UE 115-a, a UE 115-b, and a UE 115-c. The base station 105-a may be an example of a network entity, a network entity of a RAN, a network entity in a core network, or a base station 105 as described with reference to FIG. 1. The UE 115-a, the UE 115-b, and the UE 115-c may each be an example of a UE 115 as described with reference to FIG. 1. In some cases, the UE 115-a may be an example of a relay UE 115. The UE 115-b and the UE 115-c may be examples of IoT devices, such as smart devices, sensors, etc.

The wireless communications system 200 may support sidelink communications. For example, the UE 115-a may communicate with the UE 115-b on a sidelink 205-a, and the UE 115-a may communicate with the UE 115-c on a sidelink 205-b. In some cases, the UE 115-b and the UE 115-c may communicate on a sidelink 205-c. In some cases, one or more of the UEs 115 may have a communications link with the base station 105-a, such as a Uu communications link.

The UEs 115 may use secret keys for secure communications on a sidelink 205. For example, the UE 115-b and the UE 115-c may communicate on the sidelink 205-c using a secret key. In some cases, the base station 105-a may provide the secret key for the sidelink 205-c, either directly or relayed through the UE 115-a. As UE 115-b and UE 115-c communicate using the secret key, the secret key may expire, or a security level of the secret key may degrade. For example, the secret key may only be able to be used a certain number of times, after which, the secret key may expire. In some other examples, the secret key may become less secure after each use, and after a certain number of uses, a security level of the secret key may degrade below a threshold, and the secret key may be deemed expired.

A secret key may be configured with a refresh timer. Once the refresh timer expires, the secret key may be considered expired. In some cases, a secret key may expire before a refresh timer of the secret key expires. For example, the secret key may be used for threshold number of times or the security quality of the secret key may degrade below the threshold before the refresh timer expires. If a secret key used on a sidelink 205 expires before the refresh timer expires, the base station 105-*a* may be unaware that the secret key has expired.

The wireless communications system 200 supports techniques for an on-demand secret key. For example, a UE 115 may transmit an update request 210 to a network entity, such as the base station 105-*a*, to get a new secret key or to refresh a secret key. The network entity (e.g., the base station 105-*a*) may determine an update for the secret key based on receiving the update request 210, and the network entity may transmit an update message 215 including the update for the secret key in response to the update request 210. The update message 215 may include a new secret key, a refresh for the refresh timer, a secret key with a different security level, or any combination thereof.

In some cases, the UE 115-*a* may transmit the update request 210 to update a secret key which is used by the UE 115-*b* and the UE 115-*c* on the sidelink 205-*c*. For example, the UE 115-*b* or the UE 115-*c*, or both, may send a request to the UE 115-*a* to update the secret key for the sidelink 205-*c*. The request from the UE 115-*b* or the UE 115-*c* may be sent on the sidelink 205-*a* or the sidelink 205-*c*, respectively. The request from the UE 115-*b* or the UE 115-*c* may include a request for a key refresh, a stronger key to be used, or a new key, or any combination thereof. In some cases, the request send on a sidelink 205 may be transmitted via PC5 RRC signaling, a PC5 MAC control element (CE), or sidelink control information (e.g., second-stage sidelink control information (SCI)). The UE 115-*a* may then transmit the update request 210 to the base station 105-*a* to update the secret key for the sidelink 205-*c*. In some cases, the UE 115-*a* may send the update request 210 to an entity other than a serving base station 105. For example, the UE 115-*a* may send the update request 210 to a network entity in the RAN, a network entity in the core network, or an application layer, and this other entity may provide the update for the secret key.

The update request 210 to the network entity may include one or more identifier associated with one or more physical channels, indicating that the secret keys for the one or more physical channels have expired. For example, the UE 115-*a* may include the identifier of the physical layer channel so that the base station 105-*a* can update the secret key for the correct physical layer channel, as the base station 105-*a* may not be one of the devices communicating on that physical layer channel. In some cases, the update request 210 may include a resource pool identifier indicating resource pools with expired secret keys, such as if the secret keys are resource pool-specific. In some cases, the update request 210 may include a subchannel identifier indicating subchannels with expired keys, such as if the secret keys are subchannel-specific. In some cases, the update request 210 may include a timestamp related to a latest time a new secret key, or the update for the secret key, must be sent from the base station 105-*a* to the UE 115-*a*, the UE 115-*b*, the UE 115-*c*, or any combination thereof. In some examples, the update request 210 may include a request for a secret key with specific cryptographic properties or cryptographic quality of service, or both. For example, the update request 210 may request a secret key with a certain number, or a maximum number, of usages or a secret key with a certain time, or a maximum time, until a key refresh.

In some examples, the base station 105-*a* may send the update message 215 including the update to the secret key directly to one or more of the UEs 115. For example, base station 105-*a*, or another network entity, may send the update message 215 using Layer 3 secured downlink shared channel signaling, Layer 3 secured RRC signaling, a MAC CE, or any combination thereof.

If the base station 105-*a* sends the update message 215 to the relay UE 115 (e.g., the UE 115-*a*), the UE 115-*a* may indicate the updates for the secret keys to the sidelink UEs 115 (e.g., the UE 115-*b* or the UE 115-*c*, or both). The UE 115-*a* may indicate the update for the secret keys via SCI, PC5 RRC signaling, a PC5 MAC CE, or any combination thereof. For example, the base station 105-*a* may transmit the update message 215 to the UE 115-*a* with an update for a secret key associated with the sidelink 205-*c*, and the UE 115-*a* may indicate the update for the secret key associated with the sidelink 205-*c* to the UE 115-*b* or the UE 115-*c*, or both.

In some cases, the base station 105-*a* may establish a procedure to be used by the UEs 115 which are using the updated secret key. For example, the base station 105-*a* may configure an allocation of time and frequency resources for deriving the update to the secret key and a configuration of sidelink reference signals for deriving the update to the secret key. In this example, the UE 115-*a*, the UE 115-*b*, the UE 115-*c*, or any combination thereof, may derive the update to the secret key based on the procedure. For example, the UEs 115 may derive the update to the secret key, or the new secret key, based on the configured resources and the configured sidelink reference signals.

In some cases, the base station 105-*a* may send a request to an external cryptographic client 220 for the update to the secret key. For example, the base station 105-*a* may forward the update request 210, or indicate some information from the update request 210, to the external cryptographic client 220. The external cryptographic client 220 may determine the update to the secret key based on the information provided by the base station 105-*a*. The external cryptographic client 220 may indicate the update for the secret key to the base station 105-*a*, and the base station 105-*a* may send the update message 215 including information for the update to the secret key based on the update received from the externa cryptographic client. For example, instead of determining the update for the secret key at the base station 105-*a*, another entity (e.g., a core network entity) may determine the update for the secret key, which may then be conveyed via the base station 105-*a*. In some examples, the base station 105-*a* may include aspects of the external cryptographic client 220.

In some cases, a UE 115 may detect beam failure on a sidelink 205. For example, the UE 115-*a* or the UE 115-*b*, or both, may detect beam failure on the sidelink 205-*a*. The UE 115-*a* or the UE 115-*b*, or both, may request an update for the secret key for the sidelink 205-*a*. The resources used for updating the secret key may be triggered by the base station 105-*a* from known resources for secret key extraction which were previously configured, such as by RRC signaling. For example, the UE 115-*a* may send the update request 210 indicating the secret key for the sidelink 205-*a* is expired, and the UE 115-*a* may use a secret key identifier which was previously defined for the sidelink 205-*a*. Therefore, if beam failure occurs on a sidelink 205, a UE 115 may request an update for a secret key for the sidelink 205 using previously configured information, such as an identifier which was used for the sidelink 205 which experienced beam failure, and the UE 115 may use resources for secret key extraction which were previously configured for that sidelink 205.

In some cases, the base station 105-*a* may configure the UE 115-*a* with a pool of secret keys in response to the update request 210. For example, the update message 215 may indicate a pool of secret keys, and the UE 115-*a* may select which secret key to use from the assigned pool of secret keys. UE 115-*a* may, for example, select a first secret key from the pool to use for the sidelink 205-*a*, a second secret key from the pool to use for the sidelink 205-*b*, and a third secret key from the pool to be used for the sidelink 205-*c*.

In another example, the base station 105-*a* may assign a sidelink secret key associated to a unique active sidelink connection in response to each request. For example, the UE 115-*a* may send the update request 210 to request updates for secret keys for the sidelink 205-*a* and the sidelink 205-*c*, and the base station 105-*a* may transmit the update message 215 to assign a first secret key for the sidelink 205-*a* and a second secret key for the sidelink 205-*c*.

In some cases, the UE 115-*b* or the UE 115-*c*, or both, may send a request for an updated secret key to a network entity, such as the base station 105-*a*. For example, instead of going through a relay UE 115, such as the UE 115-*a*, the UE 115-*b* or the UE 115-*c*, or both, may directly send a request for an updated secret key for a sidelink 205 to the network entity. In some cases, the network entity may provide an update for the secret key directly to the UE 115-*b* or the UE 115-*c*, or both, or the network entity may send the update for the secret key to the relay UE 115.

Figure 3:
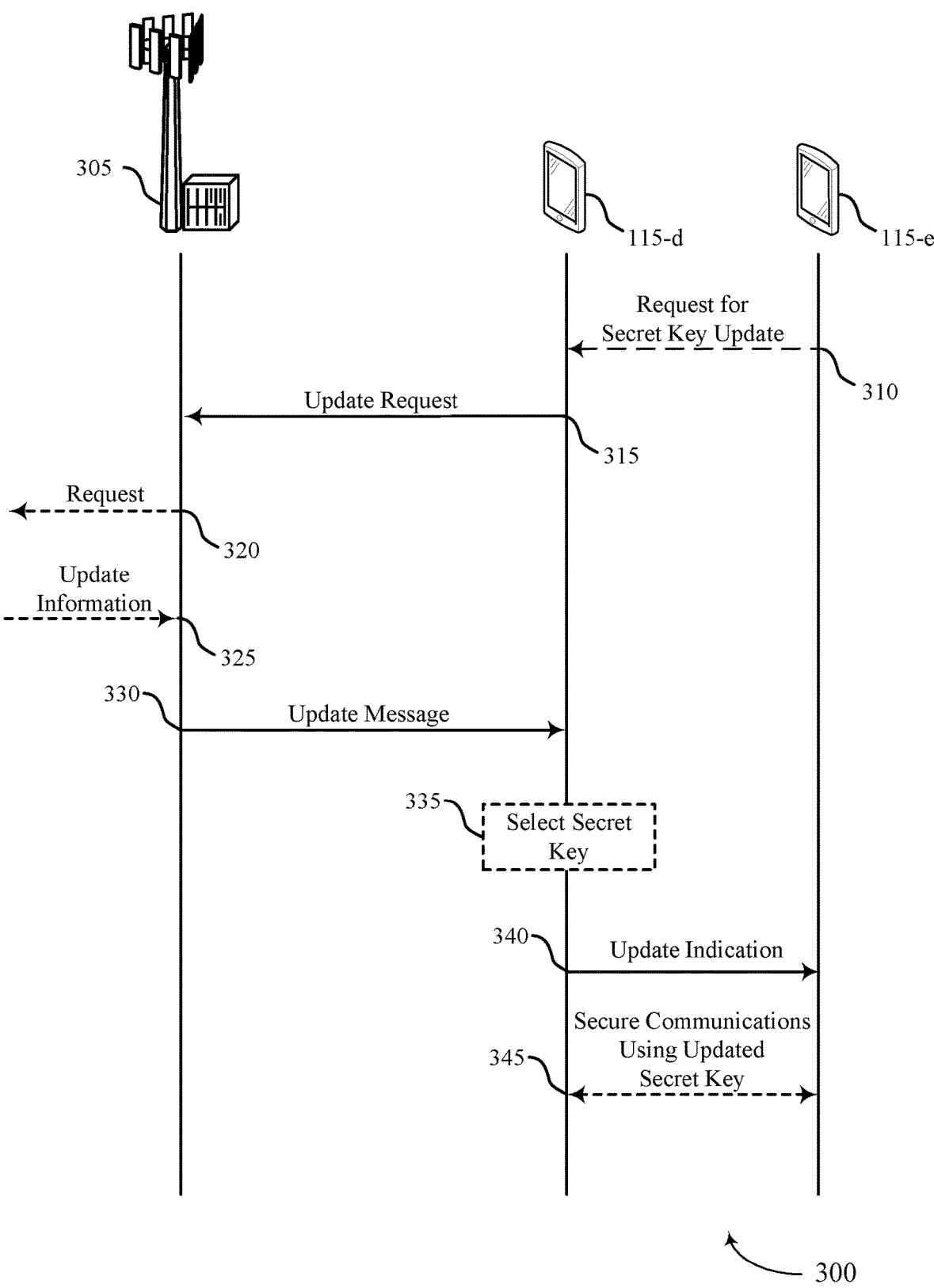
FIG. 3 illustrates an example of a process flow that supports techniques for on-demand secret key requesting and sharing in accordance with aspects of the present disclosure.

FIG. 3 illustrates an example of a process flow 300 that supports techniques for on-demand secret key requesting and sharing in accordance with aspects of the present disclosure. The process flow 300 may be implemented by a network entity 305, a UE 115-*d*, a UE 115-*e*, or any combination thereof. In some cases, some signaling or procedures of the process flow 300 may be performed in different orders than shown. Additionally, or alternatively, some signaling or processes may be added, or some signaling or processes shown may not be performed.

The network entity 305 may be an example of a base station 105 as described with reference to FIGS. 1 and 2, a core network entity, a RAN entity, an application layer, a cryptographic client, or any combination thereof. The UE 115-*d* and the UE 115-*e* may each be an example of a UE 115 as described with reference to FIGS. 1 and 2. In some cases, the UE 115-*d* may be an example of a relay UE 115, which may relay secret key update request and secret key update information between a network entity and one or more UEs 115.

In some cases, the UE 115-*d* may receive, from the UE 115-*e*, an initial request for an update to a secret key based on the secret key being expired. For example, a secret key used by the UE 115-*e* for sidelink communications may expire, and the UE 115-*e* may send a request to update the secret key to a relay UE 115, such as the UE 115-*d*. In some cases, the secret key may expire before a refresh timer for the secret key expires. For example, the secret key may have becomes unsecure (e.g., below a threshold) through repeated usage, or they key may have been used for a threshold number of times. The initial request from the UE 115-*e* may include a request for a key refresh, a higher security key, a new secret key, or any combination thereof. The initial request may be communicated via PC5 RRC signaling, a PC5 MAC CE, or SCI (e.g., second-stage SCI or SCI-2).

At 315, the UE 115-*d* may transmit, to the network entity 305, a request for an update to the secret key associated with a first physical layer channel secured for sidelink communications based at least in part on the secret key being expired. The request may include at least a first identifier of the first physical layer channel associated with the secret key. For example, the request may include one or more of a resource pool identifier, a subchannel identifier, a timestamp corresponding to a latest time for transmission of the update to the secret key, one or more cryptographic properties for the update to the secret key, a cryptographic quality of service for the update to the secret key, a maximum number of uses for the update to the secret key, a maximum refresh time for the update to the secret key, or any combination thereof. In some cases, the request may correspond to multiple physical layer channels secured for sidelink communications. For example, the UE 115-*d* may request an update for multiple secret keys corresponding to multiple different sidelink channels.

In some cases, the secret key may be associated with a physical layer sidelink channel between the UE 115-*d* and the UE 115-*e*. The UE 115-*d* may include an identifier of the sidelink channel between the UE 115-*d* and the UE 115-*e*, such that the network entity can update the key with a configuration or parameters which may be specific to that sidelink channel. In some examples, the secret key may be associated with a physical layer sidelink channel between the UE 115-*e* and another UE 115, and the UE 115-*d* may include an identifier of the sidelink channel between the UE 115-*e* and the other UE 115. In some cases, the request may include identifiers for multiple physical layer channels.

The network entity 305 may receive the request for the update to the secret key and determine the update to the secret key based on the request. In some cases, the network entity may transmit, to an external cryptographic client, a request message including the request received from the UE 115-*d* at 320. At 325, the network entity 305 may receive, from the external cryptographic entity, an indication of the update to the secret key based on the request message. For example, the network entity 305 may determine the update for the secret key (e.g., at the network entity 305), or the network entity may query the external cryptographic entity for the update. In some cases, the network entity 305 may include some information of the requests from the UE 115 in the request message to the external cryptographic client.

At 330, the network entity 305 may transmit, to the UE 115-*d*, an indication of the update to the secret key based on receiving the request. The UE 115-*d* may receive the update to the request from the network entity 305. The update to the secret key may be based on the request. For example, the update to the secret key may include, for example, a new secret key, a new secret key with a requested security level, a refresh for the secret key, or any combination thereof.

In some cases, the UE 115-*d* may receive an indication of a set of secret keys from the network entity 305 based on the request. For example, the network entity 305 may configure the UE 115-*d* with a pool of secret keys. At 335, the UE 115-*d* may select an updated secret key from the set of secret keys. For example, the UE 115-*d* may select a first updated secret key from the pool of secret keys for a first sidelink channel between the UE 115-*d* and the UE 115-*d*, and the UE 115-*d* may select a second updated secret key for a second sidelink channel between the UE 115-*e* and the other UE 115.

In some cases, the UE 115-*d* may receive an indication of an updated secret key from the network entity 305 based on the request, where the indication of the update includes the updated secret key. For example, the network entity 305 may directly indicate an updated secret key to the UE 115-*d*.

At 340, the UE 115-*d* may transmit, to the UE 115-*e* over a sidelink channel, an indication of the update to the secret key. In some cases, the secret key may correspond to a sidelink channel between the UE 115-*d* and the UE 115-*e*, and the UE 115-*d* and the UE 115-*e* may communicate securely over the sidelink channel based on the update to the secret key at 345. In another example, the secret key may correspond to the sidelink channel between the UE 115-*e* and the other UE 115-*d*, and the UE 115-*e* and the other UE 115 may communicate securely over the sidelink channel based on the update to the secret key.

Figure 4:
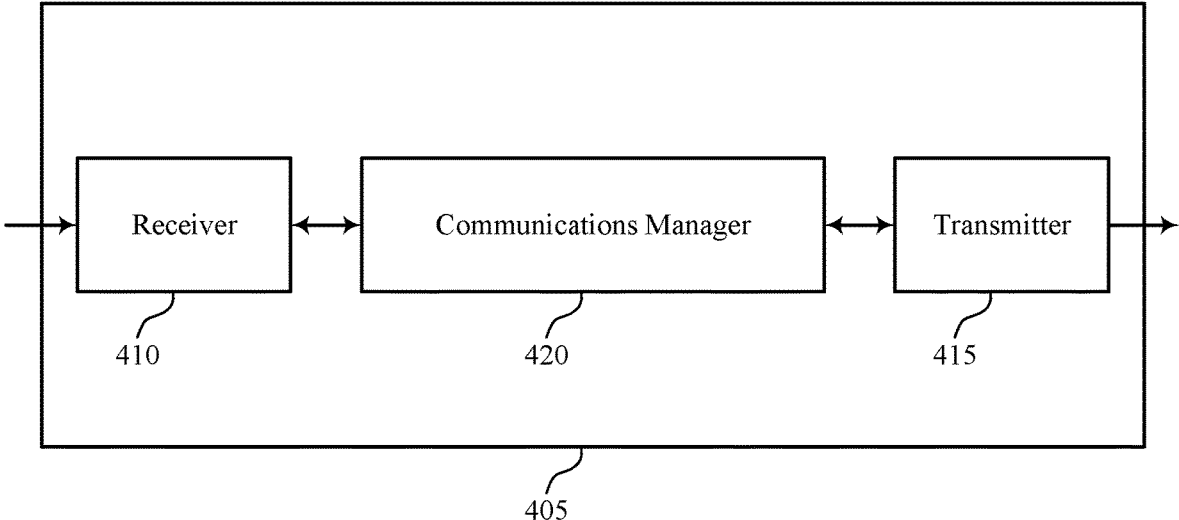
FIGS. 4 and 5 show block diagrams of devices that support techniques for on-demand secret key requesting and sharing in accordance with aspects of the present disclosure.

FIG. 4 shows a block diagram 400 of a device 405 that supports techniques for on-demand secret key requesting and sharing in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for on-demand secret key requesting and sharing). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for on-demand secret key requesting and sharing). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for on-demand secret key requesting and sharing as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a first UE in accordance with examples as disclosed herein. For example, the communications manager 420 may be configured as or otherwise support a means for transmitting, to a network entity, a request for an update to a secret key associated with a first physical layer channel secured for sidelink communications between the first UE and a second UE based on the secret key being expired, the request including at least a first identifier of the first physical layer channel associated with the secret key. The communications manager 420 may be configured as or otherwise support a means for receiving, from the network entity, the update to the secret key based on transmitting the request. The communications manager 420 may be configured as or otherwise support a means for transmitting, to the second UE over a sidelink channel, an indication of the update to the secret key.

Additionally or alternatively, the communications manager 420 may support wireless communications at a second UE in accordance with examples as disclosed herein. For example, the communications manager 420 may be configured as or otherwise support a means for transmitting a request for an update to a secret key associated with a first physical layer channel secured for sidelink communications between the second UE and another UE based on the secret key being expired. The communications manager 420 may be configured as or otherwise support a means for receiving an indication of the update to the secret key based on transmitting the request. The communications manager 420 may be configured as or otherwise support a means for communicating with the other UE over the physical layer channel based on the update to the secret key.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient utilization of communication resources, as a UE 115 may more efficiently receive updates for a secret key, and the UE 115 may avoid waiting for an updated secret key if the secret key expires before a refresh timer of the secret key expires.

Figure 5:
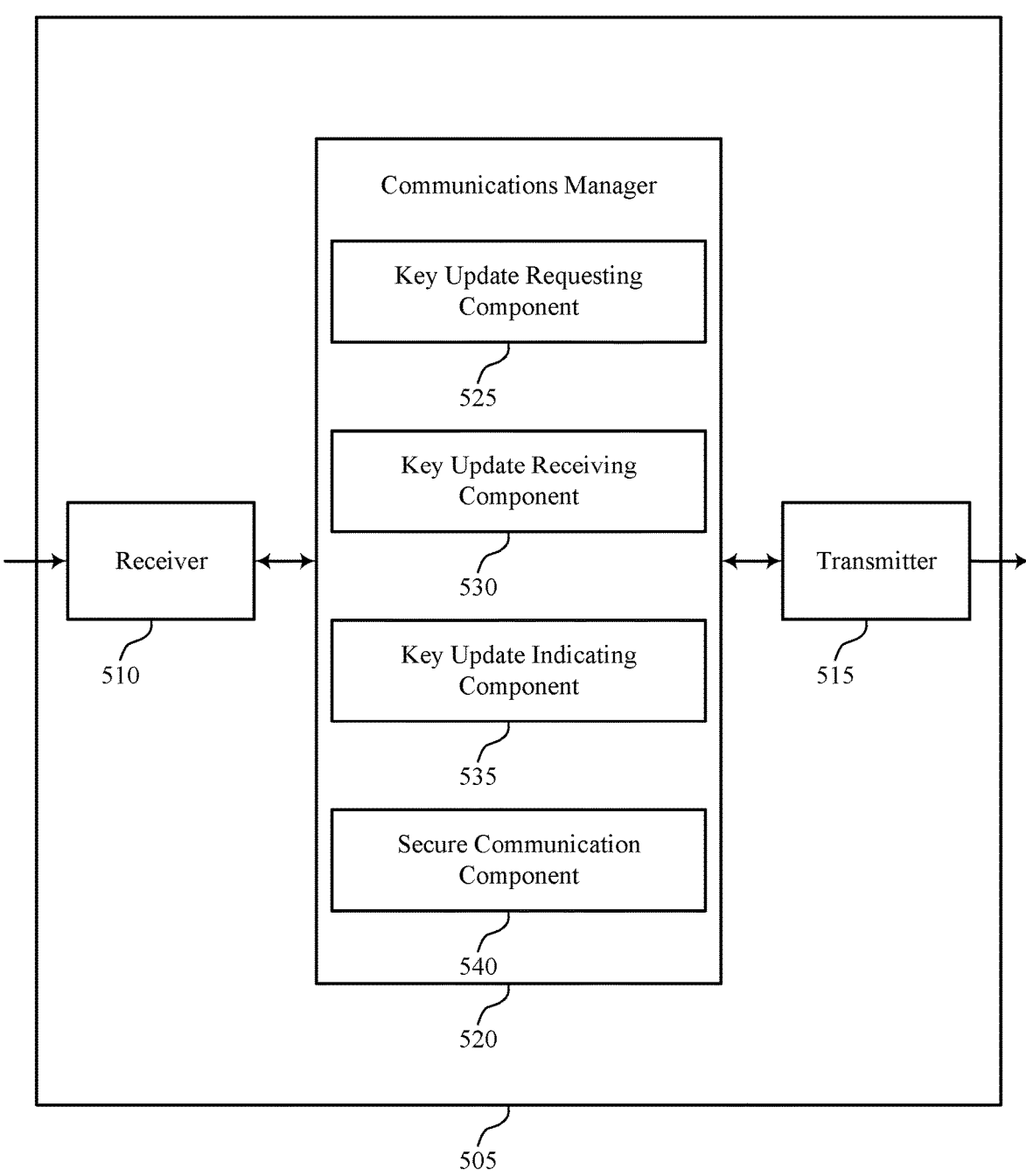

FIG. 5 shows a block diagram 500 of a device 505 that supports techniques for on-demand secret key requesting and sharing in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for on-demand secret key requesting and sharing). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for on-demand secret key requesting and sharing). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for on-demand secret key requesting and sharing as described herein. For example, the communications manager 520 may include a key update requesting component 525, a key update receiving component 530, a key update indicating component 535, a secure communication component 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. The key update requesting component 525 may be configured as or otherwise support a means for transmitting, to a network entity, a request for an update to a secret key associated with a first physical layer channel secured for sidelink communications between the first UE and a second UE based on the secret key being expired, the request including at least a first identifier of the first physical layer channel associated with the secret key. The key update receiving component 530 may be configured as or otherwise support a means for receiving, from the network entity, the update to the secret key based on transmitting the request. The key update indicating component 535 may be configured as or otherwise support a means for transmitting, to the second UE over a sidelink channel, an indication of the update to the secret key.

Additionally or alternatively, the communications manager 520 may support wireless communications at a second UE in accordance with examples as disclosed herein. The key update requesting component 525 may be configured as or otherwise support a means for transmitting a request for an update to a secret key associated with a first physical layer channel secured for sidelink communications between the second UE and another UE based on the secret key being expired. The key update receiving component 530 may be configured as or otherwise support a means for receiving an indication of the update to the secret key based on transmitting the request. The secure communication component 540 may be configured as or otherwise support a means for communicating with the other UE over the physical layer channel based on the update to the secret key.

Figure 6:
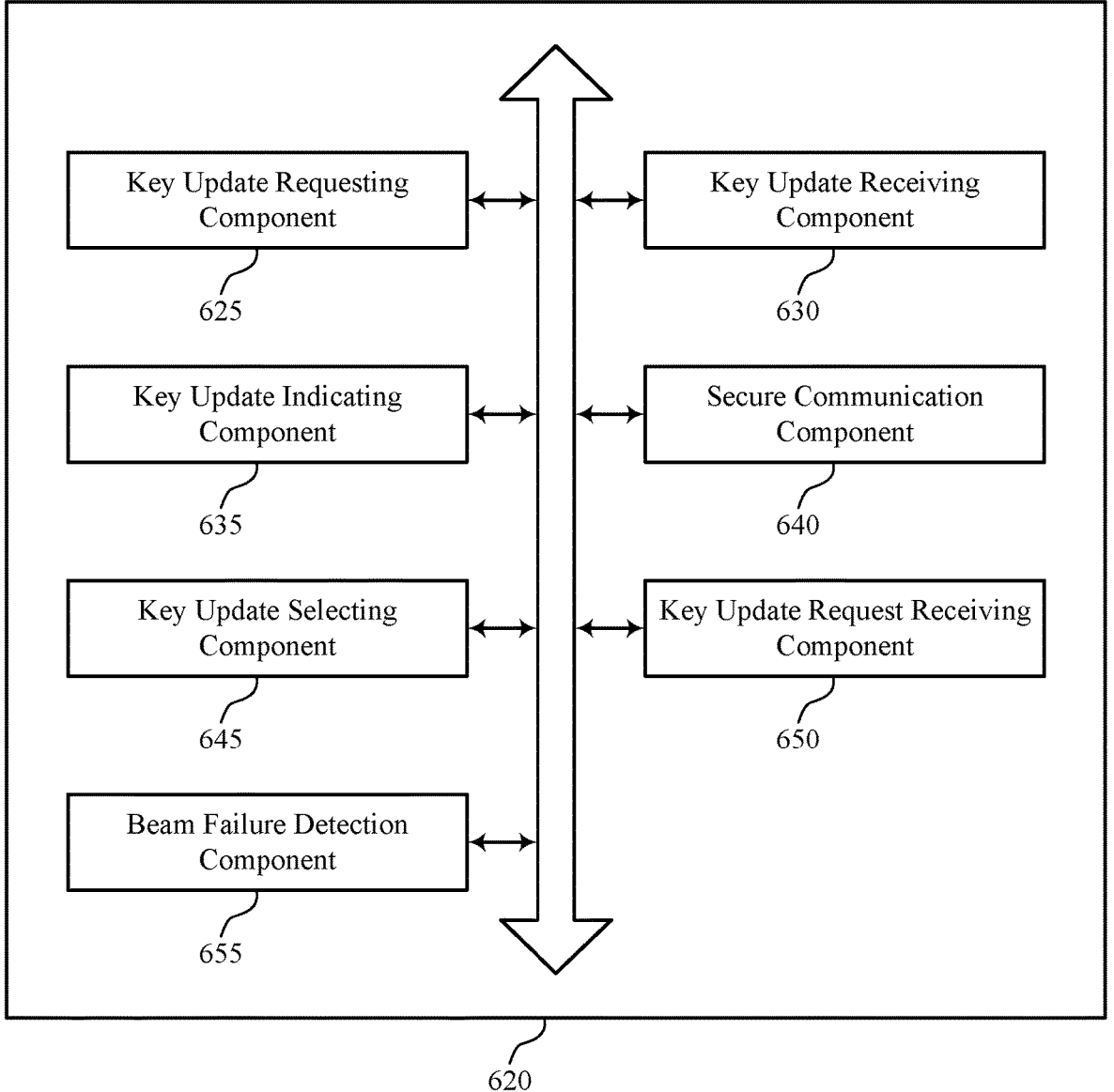
FIG. 6 shows a block diagram of a communications manager that supports techniques for on-demand secret key requesting and sharing in accordance with aspects of the present disclosure.

FIG. 6 shows a block diagram 600 of a communications manager 620 that supports techniques for on-demand secret key requesting and sharing in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for on-demand secret key requesting and sharing as described herein. For example, the communications manager 620 may include a key update requesting component 625, a key update receiving component 630, a key update indicating component 635, a secure communication component 640, a key update selecting component 645, a key update request receiving component 650, a beam failure detection component 655, or any combination thereof. Each of these components may communicate, directly or indirectly, with one another (e.g., via one or more buses).

The communications manager 620 may support wireless communications at a first UE in accordance with examples as disclosed herein. The key update requesting component 625 may be configured as or otherwise support a means for transmitting, to a network entity, a request for an update to a secret key associated with a first physical layer channel secured for sidelink communications between the first UE and a second UE based on the secret key being expired, the request including at least a first identifier of the first physical layer channel associated with the secret key. The key update receiving component 630 may be configured as or otherwise support a means for receiving, from the network entity, the update to the secret key based on transmitting the request. The key update indicating component 635 may be configured as or otherwise support a means for transmitting, to the second UE over a sidelink channel, an indication of the update to the secret key.

In some examples, to support receiving the update to the secret key, the key update receiving component 630 may be configured as or otherwise support a means for receiving an indication of a set of secret keys from the network entity based on the request. In some examples, to support receiving the update to the secret key, the key update selecting component 645 may be configured as or otherwise support a means for selecting an updated secret key from the set of secret keys, where the indication of the update includes the updated secret key.

In some examples, to support selecting the updated secret key, the key update selecting component 645 may be configured as or otherwise support a means for selecting the updated secret key based on a request from the second UE for the update to the secret key.

In some examples, the key update selecting component 645 may be configured as or otherwise support a means for receiving a configuration for the sidelink channel including time and frequency resource scheduling information and a sidelink reference signal configuration, where the indication of the update to the secret key is transmitted based on the configuration for the sidelink channel.

In some examples, to support receiving the update to the secret key, the key update receiving component 630 may be configured as or otherwise support a means for receiving an indication of an updated secret key from the network entity based on the request, where the indication of the update includes the updated secret key.

In some examples, the indication of the updated secret key is received via RRC signaling, downlink shared channel signaling, downlink control information, a MAC CE, or any combination thereof.

In some examples, the key update request receiving component 650 may be configured as or otherwise support a means for receiving, from the second UE, an initial request for the update to the secret key based on the secret key being expired, where the request for the update to the secret key is transmitted to the network entity based on receiving the initial request from the second UE.

In some examples, the initial request includes a request for a key refresh, a higher security secret key, or a new secret key, or any combination thereof. In some examples, the update for the secret key includes the key refresh, the higher security secret key, or the new secret key, or any combination thereof.

In some examples, the initial request for the update is received from the second UE via SCI, PC5 RRC signaling, a PC5 MAC CE, or any combination thereof.

In some examples, to support transmitting the request for the update to the secret key, the key update requesting component 625 may be configured as or otherwise support a means for transmitting the request for a new secret key, a security level for the update to the secret key, a refresh for the secret key, or any combination thereof, where the update to the secret key includes the new secret key, is based on the security level, or includes the refresh for the secret key, or any combination thereof.

In some examples, the beam failure detection component 655 may be configured as or otherwise support a means for detecting a beam failure on the sidelink channel, where the request for the update to the secret key is transmitted based on detecting the beam failure. In some examples, the beam failure detection component 655 may be configured as or otherwise support a means for extracting the update for the secret key based on a previous secret key.

In some examples, the secure communication component 640 may be configured as or otherwise support a means for updating the secret key based on the update to the secret key, where the first identifier for the first physical layer channel corresponds to the sidelink channel. In some examples, the secure communication component 640 may be configured as or otherwise support a means for communicating with the second UE over the sidelink channel based on updating the secret key.

In some examples, to support transmitting the indication of the update, the key update indicating component 635 may be configured as or otherwise support a means for transmitting the indication of the update to the second UE and a third UE based on a second sidelink channel between the second UE and the third UE, where the first identifier for the first physical layer channel corresponds to the second sidelink channel.

In some examples, the request includes one or more of a resource pool identifier, a subchannel identifier, a timestamp corresponding to a latest time for transmission of the update to the secret key, one or more cryptographic properties for the update to the secret key, a cryptographic quality of service for the update to the secret key, a maximum number of uses for the update to the secret key, a maximum refresh time for the update to the secret key, or any combination thereof.

Additionally or alternatively, the communications manager 620 may support wireless communications at a second UE in accordance with examples as disclosed herein. In some examples, the key update requesting component 625 may be configured as or otherwise support a means for transmitting a request for an update to a secret key associated with a first physical layer channel secured for sidelink communications between the second UE and another UE based on the secret key being expired. In some examples, the key update receiving component 630 may be configured as or otherwise support a means for receiving an indication of the update to the secret key based on transmitting the request. The secure communication component 640 may be configured as or otherwise support a means for communicating with the other UE over the physical layer channel based on the update to the secret key.

In some examples, to support transmitting the request for the update, the key update requesting component 625 may be configured as or otherwise support a means for transmitting the request to a first UE, where the indication of the update to the secret key is received from the first UE.

In some examples, the request includes a request for a key refresh, a higher security secret key, or a new secret key, or any combination thereof. In some examples, the update for the secret key includes the key refresh, the higher security secret key, or the new secret key, or any combination thereof.

In some examples, the request for the update for the secret key is transmitted to the first UE via SCI, PC5 RRC signaling, a PC5 MAC CE, or any combination thereof.

In some examples, the secure communication component 640 may be configured as or otherwise support a means for communicating with the other UE or a third UE over the sidelink channel based on the update to the secret key.

In some examples, to support transmitting the request for the update to the secret key, the key update requesting component 625 may be configured as or otherwise support a means for transmitting the request to a network entity, where the indication of the update to the secret key is received from the network entity.

In some examples, the request for the update to the secret key includes a request for a key refresh, a higher security secret key, or a new secret key, or any combination thereof. In some examples, the update for the secret key includes the key refresh, the higher security secret key, or the new secret key, or any combination thereof.

In some examples, the indication of the update to the secret key is received via RRC signaling, downlink shared channel signaling, downlink control information, a MAC CE, or any combination thereof.

In some examples, the beam failure detection component 655 may be configured as or otherwise support a means for detecting a beam failure on the sidelink channel, where the request for the update to the secret key is transmitted based on detecting the beam failure. In some examples, the beam failure detection component 655 may be configured as or otherwise support a means for extracting the update for the secret key based on a previous secret key.

Figure 7:
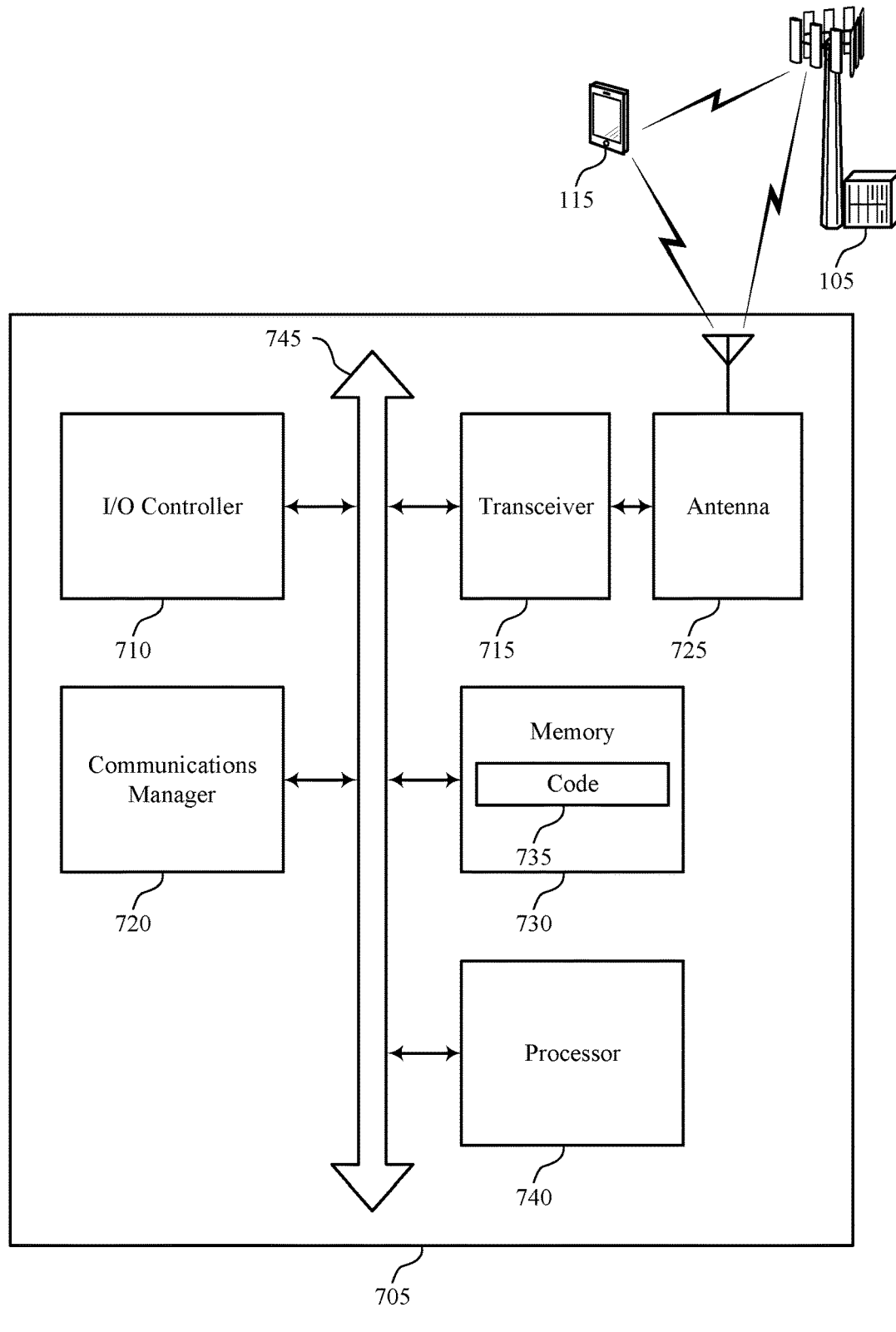
FIG. 7 shows a diagram of a system including a device that supports techniques for on-demand secret key requesting and sharing in accordance with aspects of the present disclosure.

FIG. 7 shows a diagram of a system 700 including a device 705 that supports techniques for on-demand secret key requesting and sharing in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for on-demand secret key requesting and sharing). For example, the device 705 or a component of the device 705 may include a processor 740 and memory 730 coupled to the processor 740, the processor 740 and memory 730 configured to perform various functions described herein.

The communications manager 720 may support wireless communications at a first UE in accordance with examples as disclosed herein. For example, the communications manager 720 may be configured as or otherwise support a means for transmitting, to a network entity, a request for an update to a secret key associated with a first physical layer channel secured for sidelink communications between the first UE and a second UE based on the secret key being expired, the request including at least a first identifier of the first physical layer channel associated with the secret key. The communications manager 720 may be configured as or otherwise support a means for receiving, from the network entity, the update to the secret key based on transmitting the request. The communications manager 720 may be configured as or otherwise support a means for transmitting, to the second UE over a sidelink channel, an indication of the update to the secret key.

Additionally or alternatively, the communications manager 720 may support wireless communications at a second UE in accordance with examples as disclosed herein. For example, the communications manager 720 may be configured as or otherwise support a means for transmitting a request for an update to a secret key associated with a first physical layer channel secured for sidelink communications between the second UE and another UE based on the secret key being expired. The communications manager 720 may be configured as or otherwise support a means for receiving an indication of the update to the secret key based on transmitting the request. The communications manager 720 may be configured as or otherwise support a means for communicating with the other UE over the physical layer channel based on the update to the secret key.

By including or configuring the communications manager 720 in accordance with examples as described herein, the device 705 may support techniques for more secure communications and more efficient utilization of communication resources. For example, a UE 115 may more efficiently receive updates for a secret key, and the UE 115 may avoid waiting for an updated secret key if the secret key expires before a refresh timer of the secret key expires. This may further reduce a likelihood of using a less secure secret key.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for on-demand secret key requesting and sharing as described herein, or the processor 740 and the memory 730 may be otherwise configured to perform or support such operations.

Figure 8:
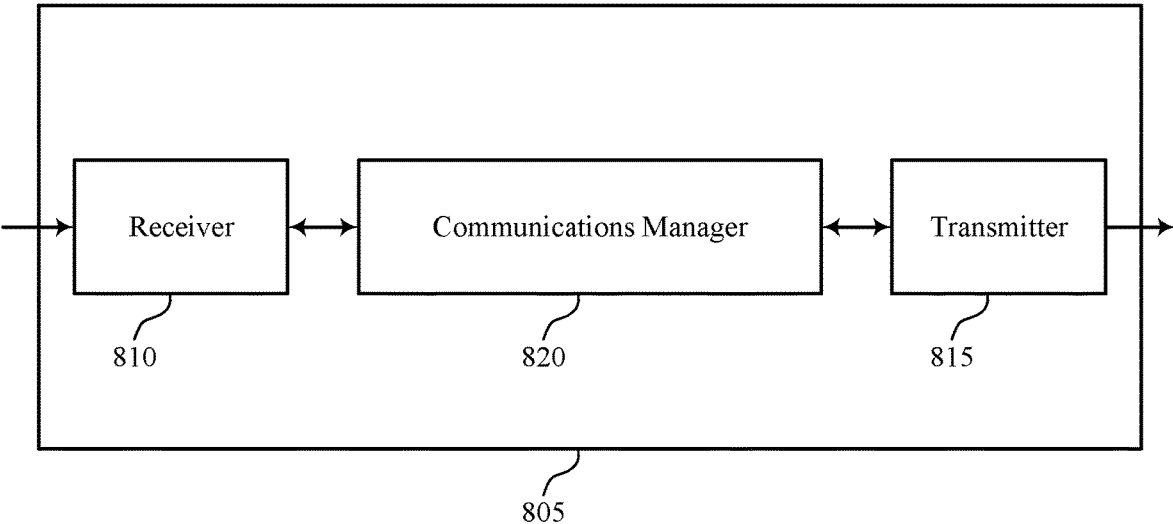
FIGS. 8 and 9 show block diagrams of devices that support techniques for on-demand secret key requesting and sharing in accordance with aspects of the present disclosure.
Figure 8:

FIG. 8 shows a block diagram 800 of a device 805 that supports techniques for on-demand secret key requesting and sharing in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for on-demand secret key requesting and sharing). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for on-demand secret key requesting and sharing). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for on-demand secret key requesting and sharing as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a network entity in accordance with examples as disclosed herein. For example, the communications manager 820 may be configured as or otherwise support a means for receiving, from a first UE, a request for an update to a secret key associated with a first physical layer channel secured for sidelink communications between the first UE and a second UE, the request indicating that the secret key is expired and including at least a first identifier of the first physical layer channel associated with the secret key. The communications manager 820 may be configured as or otherwise support a means for determining the update to the secret key based on the request. The communications manager 820 may be configured as or otherwise support a means for transmitting, to the first UE, an indication of the update to the secret key based on receiving the request.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources. For example, a base station 105 may update a secret key faster than waiting for a refresh timer to expire, which may enable a UE 115 to securely communicate on a sidelink channel without waiting for the refresh timer to expire.

Figure 9:
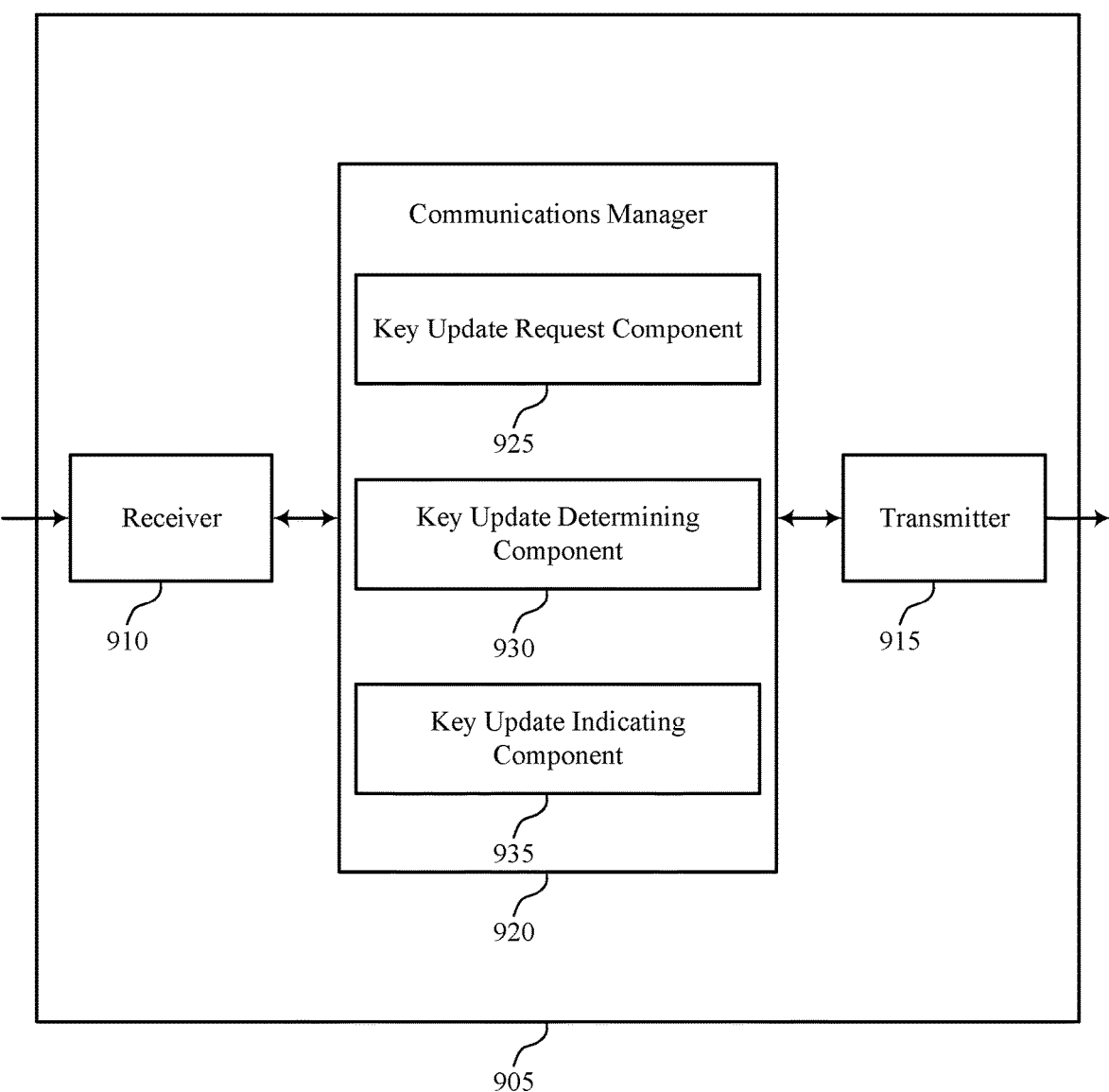

FIG. 9 shows a block diagram 900 of a device 905 that supports techniques for on-demand secret key requesting and sharing in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for on-demand secret key requesting and sharing). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for on-demand secret key requesting and sharing). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for on-demand secret key requesting and sharing as described herein. For example, the communications manager 920 may include a key update request component 925, a key update determining component 930, a key update indicating component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a network entity in accordance with examples as disclosed herein. The key update request component 925 may be configured as or otherwise support a means for receiving, from a first UE, a request for an update to a secret key associated with a first physical layer channel secured for sidelink communications between the first UE and a second UE, the request indicating that the secret key is expired and including at least a first identifier of the first physical layer channel associated with the secret key. The key update determining component 930 may be configured as or otherwise support a means for determining the update to the secret key based on the request. The key update indicating component 935 may be configured as or otherwise support a means for transmitting, to the first UE, an indication of the update to the secret key based on receiving the request.

Figure 10:
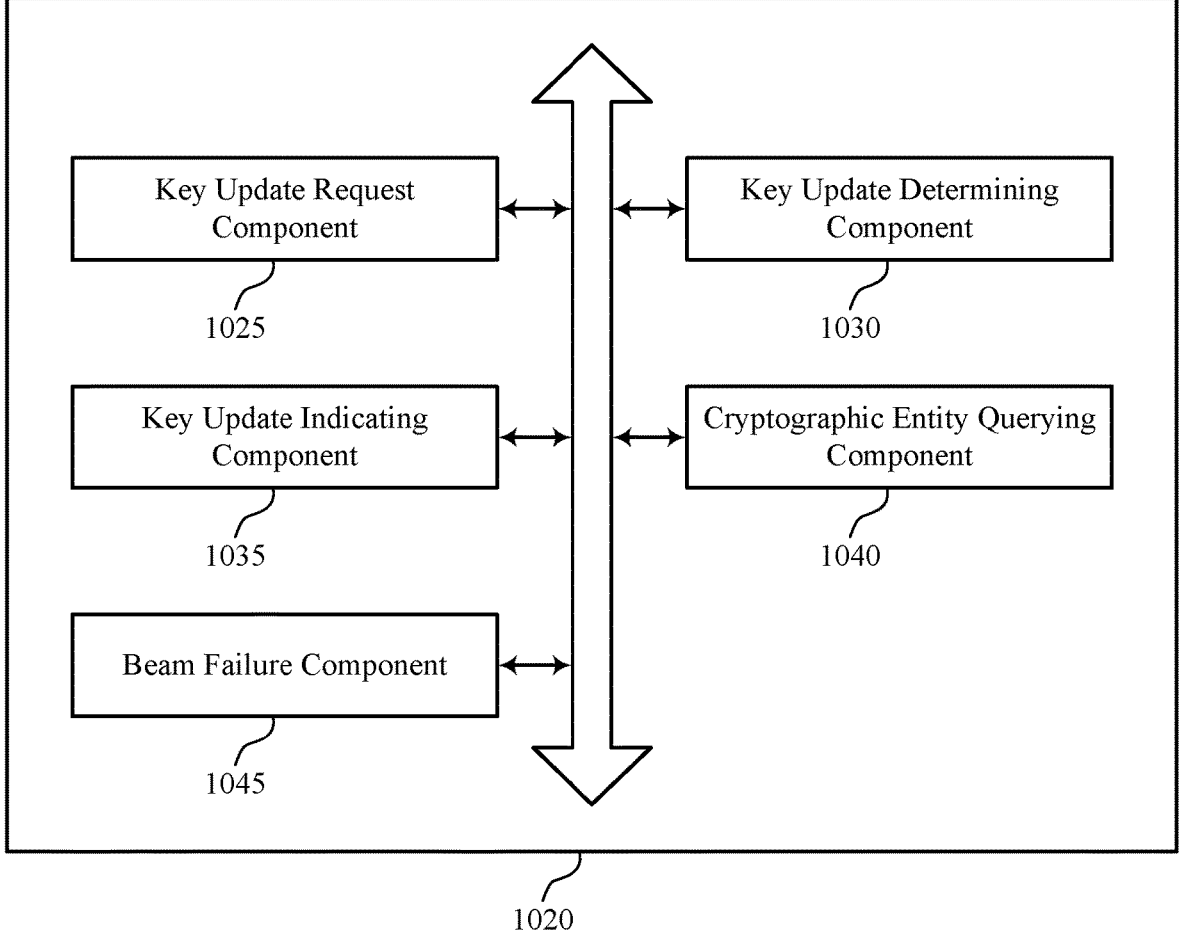
FIG. 10 shows a block diagram of a communications manager that supports techniques for on-demand secret key requesting and sharing in accordance with aspects of the present disclosure.

FIG. 10 shows a block diagram 1000 of a communications manager 1020 that supports techniques for on-demand secret key requesting and sharing in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for on-demand secret key requesting and sharing as described herein. For example, the communications manager 1020 may include a key update request component 1025, a key update determining component 1030, a key update indicating component 1035, a cryptographic entity querying component 1040, a beam failure component 1045, or any combination thereof. Each of these components may communicate, directly or indirectly, with one another (e.g., via one or more buses).

The communications manager 1020 may support wireless communications at a network entity in accordance with examples as disclosed herein. The key update request component 1025 may be configured as or otherwise support a means for receiving, from a first UE, a request for an update to a secret key associated with a first physical layer channel secured for sidelink communications between the first UE and a second UE, the request indicating that the secret key is expired and including at least a first identifier of the first physical layer channel associated with the secret key. The key update determining component 1030 may be configured as or otherwise support a means for determining the update to the secret key based on the request. The key update indicating component 1035 may be configured as or otherwise support a means for transmitting, to the first UE, an indication of the update to the secret key based on receiving the request.

In some examples, the cryptographic entity querying component 1040 may be configured as or otherwise support a means for transmitting, to an external cryptographic entity, a request message including the request received from the first UE. In some examples, the cryptographic entity querying component 1040 may be configured as or otherwise support a means for receiving, from the external cryptographic entity, an indication of the update to the secret key based on the request message.

In some examples, to support transmitting the indication of the update to the secret key, the key update indicating component 1035 may be configured as or otherwise support a means for transmitting an indication of a set of secret keys to the first UE based on the request.

In some examples, the key update indicating component 1035 may be configured as or otherwise support a means for transmitting a configuration for a sidelink channel including time and frequency resource scheduling information and a sidelink reference signal configuration, where the update to the secret key is based on the configuration for the sidelink channel.

In some examples, to support receiving the update to the secret key, the key update indicating component 1035 may be configured as or otherwise support a means for transmitting an indication of an updated secret key to the first UE based on the request, where the indication of the update includes the updated secret key.

In some examples, the beam failure component 1045 may be configured as or otherwise support a means for receiving an indication of a beam failure from the first UE, where the request for the update to the secret key is received based on the beam failure. In some examples, the beam failure component 1045 may be configured as or otherwise support a means for triggering resources for extracting the update for the secret key based on a previous secret key and the indication of the beam failure.

Figure 11:
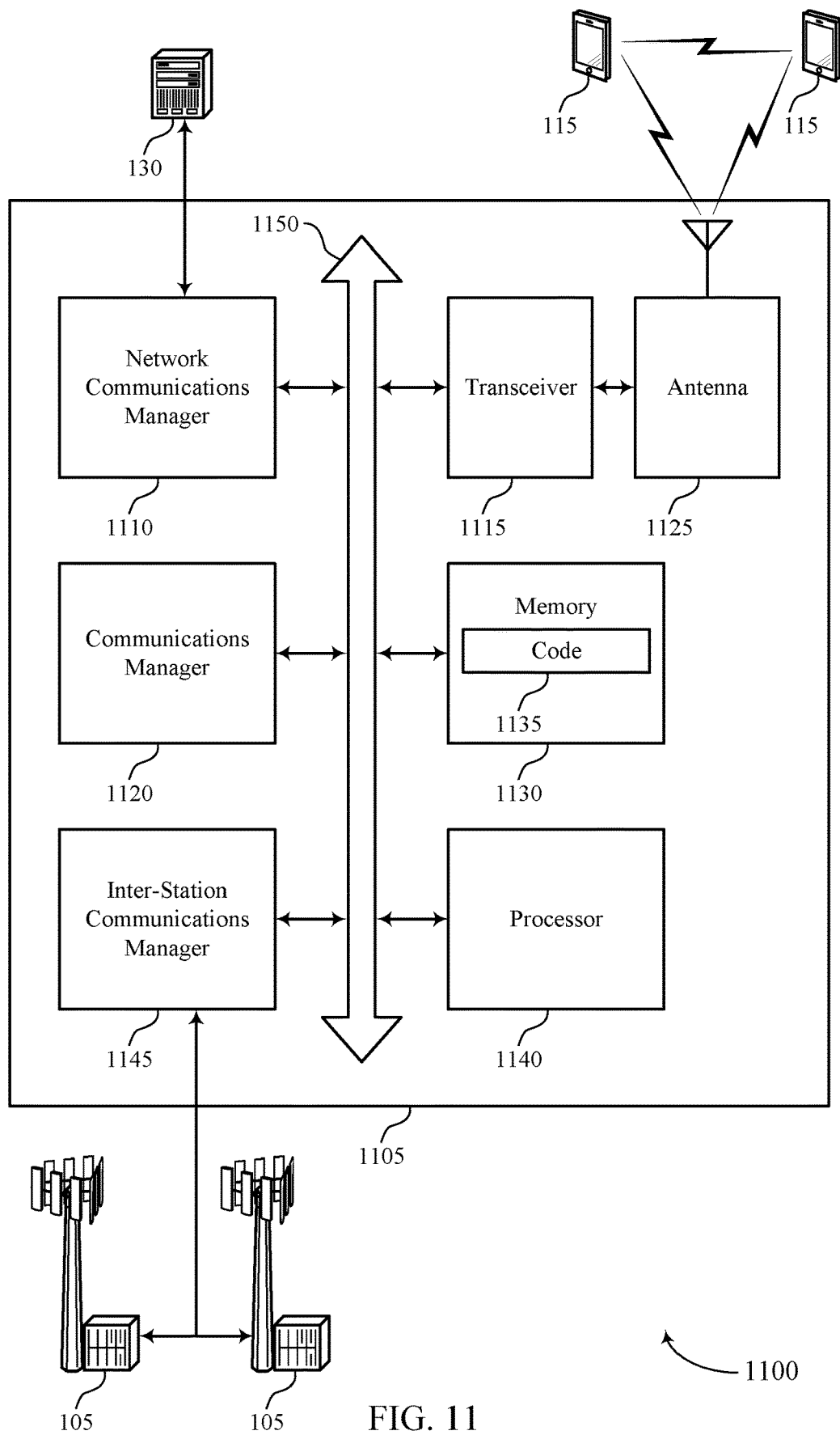
FIG. 11 shows a diagram of a system including a device that supports techniques for on-demand secret key requesting and sharing in accordance with aspects of the present disclosure.

FIG. 11 shows a diagram of a system 1100 including a device 1105 that supports techniques for on-demand secret key requesting and sharing in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for on-demand secret key requesting and sharing). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a network entity in accordance with examples as disclosed herein. For example, the communications manager 1120 may be configured as or otherwise support a means for receiving, from a first UE, a request for an update to a secret key associated with a first physical layer channel secured for sidelink communications between the first UE and a second UE, the request indicating that the secret key is expired and including at least a first identifier of the first physical layer channel associated with the secret key. The communications manager 1120 may be configured as or otherwise support a means for determining the update to the secret key based on the request. The communications manager 1120 may be configured as or otherwise support a means for transmitting, to the first UE, an indication of the update to the secret key based on receiving the request.

By including or configuring the communications manager 1120 in accordance with examples as described herein, the device 1105 may support techniques for more secure communications and more efficient utilization of communication resources. For example, a network entity, such as a base station 105, may more efficiently receive updates for a secret key, and the UE 115 may avoid waiting for an updated secret key if the secret key expires before a refresh timer of the secret key expires. This may further reduce a likelihood of using a less secure secret key.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for on-demand secret key requesting and sharing as described herein, or the processor 1140 and the memory 1130 may be otherwise configured to perform or support such operations.

FIG. 12 shows a flowchart illustrating a method 1200 that supports techniques for on-demand secret key requesting and sharing in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include transmitting, to a network entity, a request for an update to a secret key associated with a first physical layer channel secured for sidelink communications between the first UE and a second UE based on the secret key being expired, the request including at least a first identifier of the first physical layer channel associated with the secret key. The operations of 1205 may be performed in accordance with examples as disclosed herein. In some examples, aspects of the operations of 1205 may be performed by a key update requesting component 625 as described with reference to FIG. 6.

At 1210, the method may include receiving, from the network entity, the update to the secret key based on transmitting the request. The operations of 1210 may be performed in accordance with examples as disclosed herein. In some examples, aspects of the operations of 1210 may be performed by a key update receiving component 630 as described with reference to FIG. 6.

At 1215, the method may include transmitting, to the second UE over a sidelink channel, an indication of the update to the secret key. The operations of 1215 may be performed in accordance with examples as disclosed herein. In some examples, aspects of the operations of 1215 may be performed by a key update indicating component 635 as described with reference to FIG. 6.

FIG. 13 shows a flowchart illustrating a method 1300 that supports techniques for on-demand secret key requesting and sharing in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include transmitting, to a network entity, a request for an update to a secret key associated with a first physical layer channel secured for sidelink communications between the first UE and a second UE based on the secret key being expired, the request including at least a first identifier of the first physical layer channel associated with the secret key. The operations of 1305 may be performed in accordance with examples as disclosed herein. In some examples, aspects of the operations of 1305 may be performed by a key update requesting component 625 as described with reference to FIG. 6.

At 1310, the method may include receiving, from the network entity, the update to the secret key based on transmitting the request. The operations of 1310 may be performed in accordance with examples as disclosed herein. In some examples, aspects of the operations of 1310 may be performed by a key update receiving component 630 as described with reference to FIG. 6.

At 1315, the method may include receiving an indication of a set of secret keys from the network entity based on the request. The operations of 1315 may be performed in accordance with examples as disclosed herein. In some examples, aspects of the operations of 1315 may be performed by a key update receiving component 630 as described with reference to FIG. 6.

At 1320, the method may include selecting an updated secret key from the set of secret keys, where the indication of the update includes the updated secret key. The operations of 1320 may be performed in accordance with examples as disclosed herein. In some examples, aspects of the operations of 1320 may be performed by a key update selecting component 645 as described with reference to FIG. 6.

At 1325, the method may include transmitting, to the second UE over a sidelink channel, an indication of the update to the secret key. The operations of 1325 may be performed in accordance with examples as disclosed herein. In some examples, aspects of the operations of 1325 may be performed by a key update indicating component 635 as described with reference to FIG. 6.

FIG. 14 shows a flowchart illustrating a method 1400 that supports techniques for on-demand secret key requesting and sharing in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving, from a second UE, an initial request for an update to a secret key based on the secret key being expired. The operations of 1405 may be performed in accordance with examples as disclosed herein. In some examples, aspects of the operations of 1405 may be performed by a key update receiving component 630 as described with reference to FIG. 6.

At 1410, the method may include transmitting, to a network entity, a request for an update to a secret key associated with a first physical layer channel secured for sidelink communications between the first UE and a second UE based on the secret key being expired, the request including at least a first identifier of the first physical layer channel associated with the secret key, wherein the request for the update to the secret key is transmitted to the network entity based on receiving the initial request from the second UE. The operations of 1410 may be performed in accordance with examples as disclosed herein. In some examples, aspects of the operations of 1410 may be performed by a update request receiving component 650 as described with reference to FIG. 6.

At 1415, the method may include receiving, from the network entity, the update to the secret key based on transmitting the request. The operations of 1415 may be performed in accordance with examples as disclosed herein. In some examples, aspects of the operations of 1415 may be performed by a key update receiving component 630 as described with reference to FIG. 6.

At 1420, the method may include transmitting, to the second UE over a sidelink channel, an indication of the update to the secret key. The operations of 1420 may be performed in accordance with examples as disclosed herein. In some examples, aspects of the operations of 1420 may be performed by a key update indicating component 635 as described with reference to FIG. 6.

FIG. 15 shows a flowchart illustrating a method 1500 that supports techniques for on-demand secret key requesting and sharing in accordance with aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1505, the method may include transmitting a request for an update to a secret key associated with a first physical layer channel secured for sidelink communications between the second UE and another UE based on the secret key being expired. The operations of 1505 may be performed in accordance with examples as disclosed herein. In some examples, aspects of the operations of 1505 may be performed by a key update requesting component 625 as described with reference to FIG. 6.

At 1510, the method may include receiving an indication of the update to the secret key based on transmitting the request. The operations of 1510 may be performed in accordance with examples as disclosed herein. In some examples, aspects of the operations of 1510 may be performed by a key update receiving component 630 as described with reference to FIG. 6.

At 1515, the method may include communicating with the other UE over the physical layer channel based on the update to the secret key. The operations of 1515 may be performed in accordance with examples as disclosed herein. In some examples, aspects of the operations of 1515 may be performed by a secure communication component 640 as described with reference to FIG. 6.

FIG. 16 shows a flowchart illustrating a method 1600 that supports techniques for on-demand secret key requesting and sharing in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include receiving, from a first UE, a request for an update to a secret key associated with a first physical layer channel secured for sidelink communications between the first UE and a second UE, the request indicating that the secret key is expired and including at least a first identifier of the first physical layer channel associated with the secret key. The operations of 1605 may be performed in accordance with examples as disclosed herein. In some examples, aspects of the operations of 1605 may be performed by a key update request component 1025 as described with reference to FIG. 10.

At 1610, the method may include determining the update to the secret key based on the request. The operations of 1610 may be performed in accordance with examples as disclosed herein. In some examples, aspects of the operations of 1610 may be performed by a key update determining component 1030 as described with reference to FIG. 10.

At 1615, the method may include transmitting, to the first UE, an indication of the update to the secret key based on receiving the request. The operations of 1615 may be performed in accordance with examples as disclosed herein. In some examples, aspects of the operations of 1615 may be performed by a key update indicating component 1035 as described with reference to FIG. 10.

The following provides an overview of aspects of the present disclosure:

Aspect 1: A method for wireless communications at a first UE, comprising: transmitting, to a network entity, a request for an update to a secret key associated with a first physical layer channel secured for sidelink communications between the first UE and a second UE based at least in part on the secret key being expired, the request including at least a first identifier of the first physical layer channel associated with the secret key; receiving, from the network entity, the update to the secret key based at least in part on transmitting the request; and transmitting, to the second UE over a sidelink channel, an indication of the update to the secret key.

Aspect 2: The method of aspect 1, wherein receiving the update to the secret key comprises: receiving an indication of a set of secret keys from the network entity based at least in part on the request; and selecting an updated secret key from the set of secret keys, wherein the indication of the update includes the updated secret key.

Aspect 3: The method of aspect 2, wherein selecting the updated secret key comprises: selecting the updated secret key based at least in part on a request from the second UE for the update to the secret key.

Aspect 4: The method of any of aspects 2 through 3, further comprising: receiving a configuration for the sidelink channel including time and frequency resource scheduling information and a sidelink reference signal configuration, wherein the indication of the update to the secret key is transmitted based at least in part on the configuration for the sidelink channel.

Aspect 5: The method of any of aspects 1 through 4, wherein receiving the update to the secret key comprises: receiving an indication of an updated secret key from the network entity based at least in part on the request, wherein the indication of the update includes the updated secret key.

Aspect 6: The method of aspect 5, wherein the indication of the updated secret key is received via Radio Resource Control signaling, downlink shared channel signaling, downlink control information, a medium access control (MAC) control element (CE), or any combination thereof.

Aspect 7: The method of any of aspects 1 through 6, further comprising: receiving, from the second UE, an initial request for the update to the secret key based at least in part on the secret key being expired, wherein the request for the update to the secret key is transmitted to the network entity based at least in part on receiving the initial request from the second UE.

Aspect 8: The method of aspect 7, wherein the initial request includes a request for a key refresh, a higher security secret key, or a new secret key, or any combination thereof, and the update for the secret key includes the key refresh, the higher security secret key, or the new secret key, or any combination thereof.

Aspect 9: The method of any of aspects 7 through 8, wherein the initial request for the update is received from the second UE via sidelink control information, PC5 Radio Resource Control (RRC) signaling, a PC5 medium access control (MAC) control element (CE), or any combination thereof.

Aspect 10: The method of any of aspects 1 through 9, wherein transmitting the request for the update to the secret key comprises: transmitting the request for a new secret key, a security level for the update to the secret key, a refresh for the secret key, or any combination thereof, wherein the update to the secret key includes the new secret key, is based at least in part on the security level, or includes the refresh for the secret key, or any combination thereof.

Aspect 11: The method of any of aspects 1 through 10, further comprising: detecting a beam failure on the sidelink channel, wherein the request for the update to the secret key is transmitted based at least in part on detecting the beam failure; and extracting the update for the secret key based at least in part on a previous secret key.

Aspect 12: The method of any of aspects 1 through 11, further comprising: updating the secret key based at least in part on the update to the secret key, wherein the first identifier for the first physical layer channel corresponds to the sidelink channel; and communicating with the second UE over the sidelink channel based at least in part on updating the secret key.

Aspect 13: The method of any of aspects 1 through 12, wherein transmitting the indication of the update comprises: transmitting the indication of the update to the second UE and a third UE based at least in part on a second sidelink channel between the second UE and the third UE, wherein the first identifier for the first physical layer channel corresponds to the second sidelink channel.

Aspect 14: The method of any of aspects 1 through 13, wherein the request includes one or more of a resource pool identifier, a subchannel identifier, a timestamp corresponding to a latest time for transmission of the update to the secret key, one or more cryptographic properties for the update to the secret key, a cryptographic quality of service for the update to the secret key, a maximum number of uses for the update to the secret key, a maximum refresh time for the update to the secret key, or any combination thereof.

Aspect 15: A method for wireless communications at a second UE, comprising: transmitting a request for an update to a secret key associated with a first physical layer channel secured for sidelink communications between the second UE and another UE based at least in part on the secret key being expired; receiving an indication of the update to the secret key based at least in part on transmitting the request; and communicating with the other UE over the physical layer channel based at least in part on the update to the secret key.

Aspect 16: The method of aspect 15, wherein transmitting the request for the update comprises: transmitting the request to a first UE, wherein the indication of the update to the secret key is received from the first UE.

Aspect 17: The method of aspect 16, wherein the request includes a request for a key refresh, a higher security secret key, or a new secret key, or any combination thereof, and the update for the secret key includes the key refresh, the higher security secret key, or the new secret key, or any combination thereof.

Aspect 18: The method of any of aspects 16 through 17, wherein the request for the update for the secret key is transmitted to the first UE via sidelink control information, PC5 Radio Resource Control (RRC) signaling, a PC5 medium access control (MAC) control element (CE), or any combination thereof.

Aspect 19: The method of any of aspects 16 through 18, further comprising: communicating with the other UE or a third UE over the sidelink channel based at least in part on the update to the secret key.

Aspect 20: The method of any of aspects 15 through 19, wherein transmitting the request for the update to the secret key comprises: transmitting the request to a network entity, wherein the indication of the update to the secret key is received from the network entity.

Aspect 21: The method of aspect 20, wherein the request for the update to the secret key includes a request for a key refresh, a higher security secret key, or a new secret key, or any combination thereof, and the update for the secret key includes the key refresh, the higher security secret key, or the new secret key, or any combination thereof.

Aspect 22: The method of any of aspects 20 through 21, wherein the indication of the update to the secret key is received via Radio Resource Control signaling, downlink shared channel signaling, downlink control information, a medium access control (MAC) control element (CE), or any combination thereof.

Aspect 23: The method of any of aspects 15 through 22, further comprising: detecting a beam failure on the sidelink channel, wherein the request for the update to the secret key is transmitted based at least in part on detecting the beam failure; and extracting the update for the secret key based at least in part on a previous secret key.

Aspect 24: A method for wireless communications at a network entity, comprising: receiving, from a first UE, a request for an update to a secret key associated with a first physical layer channel secured for sidelink communications between the first UE and a second UE, the request indicating that the secret key is expired and including at least a first identifier of the first physical layer channel associated with the secret key; determining the update to the secret key based at least in part on the request; and transmitting, to the first UE, an indication of the update to the secret key based at least in part on receiving the request.

Aspect 25: The method of aspect 24, further comprising: transmitting, to an external cryptographic entity, a request message including the request received from the first UE; and receiving, from the external cryptographic entity, an indication of the update to the secret key based at least in part on the request message.

Aspect 26: The method of any of aspects 24 through 25, wherein transmitting the indication of the update to the secret key comprises: transmitting an indication of a set of secret keys to the first UE based at least in part on the request.

Aspect 27: The method of aspect 26, further comprising: transmitting a configuration for a sidelink channel including time and frequency resource scheduling information and a sidelink reference signal configuration, wherein the update to the secret key is based at least in part on the configuration for the sidelink channel.

Aspect 28: The method of any of aspects 24 through 27, wherein receiving the update to the secret key comprises: transmitting an indication of an updated secret key to the first UE based at least in part on the request, wherein the indication of the update includes the updated secret key.

Aspect 29: The method of any of aspects 24 through 28, further comprising: receiving an indication of a beam failure from the first UE, wherein the request for the update to the secret key is received based at least in part on the beam failure; and triggering resources for extracting the update for the secret key based at least in part on a previous secret key and the indication of the beam failure.

Aspect 30: An apparatus for wireless communications at a first UE, comprising a processor; memory coupled with the processor; and instructions stored in the memory and executable by the processor to cause the apparatus to perform a method of any of aspects 1 through 14.

Aspect 31: An apparatus for wireless communications at a first UE, comprising at least one means for performing a method of any of aspects 1 through 14.

Aspect 32: A non-transitory computer-readable medium storing code for wireless communications at a first UE, the code comprising instructions executable by a processor to perform a method of any of aspects 1 through 14.

Aspect 33: An apparatus for wireless communications at a second UE, comprising a processor; memory coupled with the processor; and instructions stored in the memory and executable by the processor to cause the apparatus to perform a method of any of aspects 15 through 23.

Aspect 34: An apparatus for wireless communications at a second UE, comprising at least one means for performing a method of any of aspects 15 through 23.

Aspect 35: A non-transitory computer-readable medium storing code for wireless communications at a second UE, the code comprising instructions executable by a processor to perform a method of any of aspects 15 through 23.

Aspect 36: An apparatus for wireless communications at a network entity, comprising a processor; memory coupled with the processor; and instructions stored in the memory and executable by the processor to cause the apparatus to perform a method of any of aspects 24 through 29.

Aspect 37: An apparatus for wireless communications at a network entity, comprising at least one means for performing a method of any of aspects 24 through 29.

Aspect 38: A non-transitory computer-readable medium storing code for wireless communications at a network entity, the code comprising instructions executable by a processor to perform a method of any of aspects 24 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
transmitting, to a network entity, a request for an update to a secret key associated with a first physical layer channel secured for sidelink communications between the first UE and a second UE based at least in part on the secret key being expired, the request including at least a first identifier of the first physical layer channel associated with the secret key;
receiving, from the network entity, the update to the secret key based at least in part on transmitting the request; and
transmitting, to the second UE over a sidelink channel, an indication of the update to the secret key.

2. The method of claim 1, wherein receiving the update to the secret key comprises:
receiving an indication of a set of secret keys from the network entity based at least in part on the request; and
selecting an updated secret key from the set of secret keys, wherein the indication of the update includes the updated secret key.

3. The method of claim 2, wherein selecting the updated secret key comprises:
selecting the updated secret key based at least in part on a request from the second UE for the update to the secret key.

4. The method of claim 2, further comprising:
receiving a configuration for the sidelink channel including time and frequency resource scheduling information and a sidelink reference signal configuration, wherein the indication of the update to the secret key is transmitted based at least in part on the configuration for the sidelink channel.

5. The method of claim 1, wherein receiving the update to the secret key comprises:

receiving an indication of an updated secret key from the network entity based at least in part on the request, wherein the indication of the update includes the updated secret key.

6. The method of claim 5, wherein the indication of the updated secret key is received via Radio Resource Control signaling, downlink shared channel signaling, downlink control information, a medium access control (MAC) control element (CE), or any combination thereof.

7. The method of claim 1, further comprising:
receiving, from the second UE, an initial request for the update to the secret key based at least in part on the secret key being expired, wherein the request for the update to the secret key is transmitted to the network entity based at least in part on receiving the initial request from the second UE.

8. The method of claim 7, wherein:
the initial request includes a request for a key refresh, a higher security secret key, or a new secret key, or any combination thereof, and
the update for the secret key includes the key refresh, the higher security secret key, or the new secret key, or any combination thereof.

9. The method of claim 7, wherein the initial request for the update is received from the second UE via sidelink control information, PC5 Radio Resource Control (RRC) signaling, a PC5 medium access control (MAC) control element (CE), or any combination thereof.

10. The method of claim 1, wherein transmitting the request for the update to the secret key comprises:
transmitting the request for a new secret key, a security level for the update to the secret key, a refresh for the secret key, or any combination thereof, wherein the update to the secret key includes the new secret key, is based at least in part on the security level, or includes the refresh for the secret key, or any combination thereof.

11. The method of claim 1, further comprising:
detecting a beam failure on the sidelink channel, wherein the request for the update to the secret key is transmitted based at least in part on detecting the beam failure; and
extracting the update for the secret key based at least in part on a previous secret key.

12. The method of claim 1, further comprising:
updating the secret key based at least in part on the update to the secret key, wherein the first identifier for the first physical layer channel corresponds to the sidelink channel; and
communicating with the second UE over the sidelink channel based at least in part on updating the secret key.

13. The method of claim 1, wherein transmitting the indication of the update comprises:
transmitting the indication of the update to the second UE and a third UE based at least in part on a second sidelink channel between the second UE and the third UE, wherein the first identifier for the first physical layer channel corresponds to the second sidelink channel.

14. The method of claim 1, wherein the request includes one or more of a resource pool identifier, a subchannel identifier, a timestamp corresponding to a latest time for transmission of the update to the secret key, one or more cryptographic properties for the update to the secret key, a cryptographic quality of service for the update to the secret key, a maximum number of uses for the update to the secret key, a maximum refresh time for the update to the secret key, or any combination thereof.

15. A method for wireless communications at a second user equipment (UE), comprising:

transmitting a request for an update to a secret key associated with a first physical layer channel secured for sidelink communications between the second UE and another UE based at least in part on the secret key being expired and further based at least in part on detecting a beam failure on the physical layer channel;

receiving an indication of the update to the secret key based at least in part on transmitting the request; and communicating with the other UE over the physical layer channel based at least in part on the update to the secret key.

16. The method of claim 15, wherein transmitting the request for the update comprises:

transmitting the request to a first UE, wherein the indication of the update to the secret key is received from the first UE.

17. The method of claim 16, wherein:

the request includes a request for a key refresh, a higher security secret key, or a new secret key, or any combination thereof, and the update for the secret key includes the key refresh, the higher security secret key, or the new secret key, or any combination thereof.

18. The method of claim 16, wherein the request for the update for the secret key is transmitted to the first UE via sidelink control information, PC5 Radio Resource Control (RRC) signaling, a PC5 medium access control (MAC) control element (CE), or any combination thereof.

19. The method of claim 16, further comprising:

communicating with the other UE or a third UE over the sidelink channel based at least in part on the update to the secret key.

20. The method of claim 15, wherein transmitting the request for the update to the secret key comprises:

transmitting the request to a network entity, wherein the indication of the update to the secret key is received from the network entity.

21. The method of claim 20, wherein:

the request for the update to the secret key includes a request for a key refresh, a higher security secret key, or a new secret key, or any combination thereof, and the update for the secret key includes the key refresh, the higher security secret key, or the new secret key, or any combination thereof.

22. The method of claim 20, wherein the indication of the update to the secret key is received via Radio Resource Control signaling, downlink shared channel signaling, downlink control information, a medium access control (MAC) control element (CE), or any combination thereof.

23. The method of claim 15, further comprising:

extracting the update for the secret key based at least in part on a previous secret key.

24. A method for wireless communications at a network entity, comprising:

receiving, from a first user equipment (UE), a request for an update to a secret key associated with a first physical layer channel secured for sidelink communications between the first UE and a second UE, the request indicating that the secret key is expired and including at least a first identifier of the first physical layer channel associated with the secret key;

determining the update to the secret key based at least in part on the request; and transmitting, to the first UE, an indication of the update to the secret key based at least in part on receiving the request.

25. The method of claim 24, further comprising:

transmitting, to an external cryptographic entity, a request message including the request received from the first UE; and receiving, from the external cryptographic entity, an indication of the update to the secret key based at least in part on the request message.

26. The method of claim 24, wherein transmitting the indication of the update to the secret key comprises:

transmitting an indication of a set of secret keys to the first UE based at least in part on the request.

27. The method of claim 26, further comprising:

transmitting a configuration for a sidelink channel including time and frequency resource scheduling information and a sidelink reference signal configuration, wherein the update to the secret key is based at least in part on the configuration for the sidelink channel.

28. The method of claim 24, wherein receiving the update to the secret key comprises:

transmitting an indication of an updated secret key to the first UE based at least in part on the request, wherein the indication of the update includes the updated secret key.

29. The method of claim 24, further comprising:

receiving an indication of a beam failure from the first UE, wherein the request for the update to the secret key is received based at least in part on the beam failure; and triggering resources for extracting the update for the secret key based at least in part on a previous secret key and the indication of the beam failure.

30. A first user equipment (UE) for wireless communication, comprising:

at least one processor;

at least one memory coupled with the at least one processor; and instructions stored in the at least one memory and executable by the at least one processor to cause the UE to:

transmit, to a network entity, a request for an update to a secret key associated with a first physical layer channel secured for sidelink communications between the first UE and a second UE based at least in part on the secret key being expired, the request including at least a first identifier of the first physical layer channel associated with the secret key;

receive, from the network entity, the update to the secret key based at least in part on transmitting the request; and transmit, to the second UE over a sidelink channel, an indication of the update to the secret key.

* * * * *